United States Patent [19]
Otsu et al.

[11] Patent Number: 6,123,163
[45] Date of Patent: Sep. 26, 2000

[54] CONTROLLING APPARATUS FOR A HYBRID CAR

[75] Inventors: Atsushi Otsu; Toru Takeda; Osamu Suzuki; Kaoru Hatanaka, all of Wako, Japan

[73] Assignee: Honda Giken Kogyo Kabushiki Kaisha, Tokyo, Japan

[21] Appl. No.: 09/153,031

[22] Filed: Sep. 15, 1998

[30] Foreign Application Priority Data

Sep. 15, 1997 [JP] Japan .................................. 9-269382
Sep. 16, 1997 [JP] Japan .................................. 9-269403
Jul. 7, 1998 [JP] Japan ................................. 10-192185

[51] Int. Cl.$^7$ ...................................................... B60K 6/04
[52] U.S. Cl. ...................... 180/65.8; 180/65.4; 180/65.8; 318/376
[58] Field of Search ................................ 180/65.1, 65.2, 180/65.3, 65.4, 65.8; 701/22, 110; 318/8, 376

[56] References Cited

U.S. PATENT DOCUMENTS

| | | |
|---|---|---|
| 4,335,429 | 6/1982 | Kawakatsu . |
| 5,806,617 | 9/1998 | Yamaguchi ............................ 180/65.2 |
| 5,823,280 | 10/1998 | Lateur et al. ......................... 180/65.2 |
| 5,823,281 | 10/1998 | Yamaguchi et al. ................... 180/65.2 |
| 5,865,263 | 2/1999 | Yamaguchi et al. ................... 180/65.2 |
| 5,984,033 | 11/1999 | Tamagawa et al. ................... 180/65.2 |

FOREIGN PATENT DOCUMENTS

| | | |
|---|---|---|
| 0725474A1 | 8/1996 | European Pat. Off. . |
| 4324010A1 | 1/1995 | Germany . |
| 19629235A1 | 1/1997 | Germany . |
| 522931A | 1/1993 | Japan . |

*Primary Examiner*—Michael Mar
*Attorney, Agent, or Firm*—Birch, Stewart, Kolasch & Birch, LLP

[57] ABSTRACT

A controlling apparatus for a hybrid car can arbitrarily select whether the hybrid car should be powered principally with an engine or principally with a generator-motor, depending upon driving conditions.

20 Claims, 34 Drawing Sheets

UPON ACCELERATION

UPON DECELERATION

FIG. 15

CONTROLLING APPARATUS FOR A HYBRID CAR

BACKGROUND OF THE INVENTION

1. Field of the Invention

This invention relates to a controlling apparatus for a hybrid car provided with an internal combustion engine and electric driving means.

2. Description of the Relevant Art

For an engine of a vehicle, torque and revolution number characteristics over a wide range are required so that the engine may operate in any running condition (constant speed, acceleration, uphill road running and so forth). Generally, the torque and the number of revolutions of the engine in which the fuel consumption efficiency is high are limited to a range peculiar to the engine. Therefore, there has been proposed a hybrid car wherein an engine and a generator-motor are carried on an automobile so that drawbacks of one may be made up for by the other to raise the overall energy efficiency of the car.

In a conventional hybrid car, the engine is designed with a reduced capacity and is normally operated only in a range in which it exhibits a high fuel consumption efficiency. Furthermore, a controlling apparatus for the hybrid car oversees regenerative control such that, when the car is accelerated or runs on an uphill road or the like, driving of the generator-motor is controlled with supplied power from a power supply such as a battery to make up for an insufficient driving torque. However, when the output of the engine exhibits some surplus power, generated energy obtained when the generator-motor is driven by the engine is regenerated into the power supply such as a battery.

A controlling apparatus for a conventional hybrid car wherein an operation amount of an accelerator pedal by a driver during running of the vehicle is detected by an accelerator sensor. An engine torque is calculated from a throttle opening based on the detection signal and an engine revolution number based on a signal is detected by a pulser provided on a crankshaft of an engine. Regeneration current of a motor is calculated so that, when the calculated torque is lower than a fuel consumption optimum torque upon the revolution number, the throttle opening may be increased by a difference between them and a torque corresponding to the difference may be generated to control the engine and the motor. A device of this type is disclosed in the official gazette of Japanese Patent Laid-Open Application No. Heisei 5-22931.

With the controlling apparatus for a conventional hybrid car, since a driving region of the engine and a driving region of the generator-motor in a region set in accordance with a vehicle speed and an accelerator opening are determined in advance by the controlling apparatus, a driver cannot select arbitrarily whether gasoline should be preserved or a battery should be preserved. The conventional hybrid car employs a controlling method wherein the two different power sources of the engine and the motor are combined and a driving output torque and/or a revolution number of each of the power sources are calculated. Calculation is performed based on the detected signals to compensate for a torque difference based on a result of the calculation or change over between the two different power sources depending upon the vehicle speed or the like.

In the conventional hybrid car, where the opening degree of the throttle is controlled based on a signal from the accelerator sensor and the revolution number signal of the engine to attain a torque requested by a driver, the output torque amount of the engine is different depending upon the condition in which the engine is used such as whether it is cold or hot, an individual difference of the engine and so forth, by which the linearity of the running driving torque with respect to the accelerator is damaged.

Also in the conventional hybrid car, by control based merely on signals of the accelerator sensor and the engine revolution number, the two power sources of different characteristics of the engine which has a long response time until a required torque is reached and a moderate startup is exhibited, and the motor which has a short response time and exhibits a rapid startup, the running driving force is discontinuous and lacks smoothness.

Furthermore, where a torque is to be detected from a driving power outputting element of each of the two power sources of the engine and the motor, when the use condition is cold, torque calculations for the engine which exhibits a large torque variation and the motor which exhibits a small torque variation must be processed at all times. Where torque sensors are used individually for the driving power outputting elements of the two power sources of the engine and the motor, the conventional hybrid car has an increased number of parts, an increased mounting space and so forth.

SUMMARY OF THE INVENTION

The present invention has been made to solve one or more of the drawbacks of the prior art described above.

It is therefore a first object of the present invention to provide a controlling apparatus for a hybrid car which is characterized in that driving of an engine and a generator-motor is controlled between a full automatic mode in which the engine is started at a predetermined timing in response to a vehicle speed and a throttle opening, and a semi-automatic mode in which driving of the engine is started at a timing longer than the predetermined timing depending upon a changing over operation of a mode switch. Since the controlling apparatus for a hybrid car according to the first object of the present invention controls driving of the engine and the generator-motor by discriminating the full automatic mode and the semi-automatic mode by a changing over operation of the mode switch, running principally with the engine and running principally with the EV (generator-motor) are possible. Accordingly, any of the running modes can be selected arbitrarily in accordance with a characteristic of a district in which the car is running or an object of the driver, and a good system as a hybrid vehicle can be provided.

A second object of the present invention is to provide a hybrid car including aimed torque calculation means for calculating an aimed torque based on an accelerator operation amount signal from an accelerator sensor for detecting an accelerator operation amount of a driver and a vehicle speed signal from a vehicle speed sensor for detecting a speed of the vehicle. Torque detection means is provided at or downstream of a joining portion of the driving output power of the engine and a generator-motor for detecting an actual torque. Furthermore, the engine includes aimed opening means for calculating an aimed opening based on an aimed torque signal, and an engine revolution signal and is controlled based on an aimed opening signal from the aimed opening means while the generator-motor is controlled based on the aimed torque signal and an actual torque signal.

With the controlling apparatus for a hybrid car according to the second object of the invention, since the engine includes the aimed opening means for calculating an aimed opening based on the aimed torque signal and the engine revolution signal and is controlled based on the aimed opening signal from the aimed opening means while the generator-motor is controlled based on the aimed torque signal and an actual torque signal, a linearity of the running driving torque can be obtained.

A third object of the present invention is to provide a hybrid car wherein the engine includes a throttle, a pulser for detecting a number of revolutions, engine revolution number detection means for detecting a number of revolutions of the engine from the pulser, and aimed opening calculation means for calculating an opening of the throttle based on the aimed torque signal and the engine revolution number signal, and a throttle opening, based on which a fuel injection amount is controlled. The generator-motor includes a generator for generating regeneration current by rotation from the drive shaft, and motor control means for controlling a motor based on the aimed torque signal and the actual torque signal. Driving of the generator-motor is controlled based on a driving control signal from the motor controlling means.

With the controlling apparatus for a hybrid car according to the third object of the invention, the engine calculates, based on the aimed torque signal and the engine revolution number signal, a throttle opening, based on which the fuel injection amount is controlled. The generator-motor includes a generator for generating regeneration current by rotation from the drive shaft. Motor control means controls a motor based on the aimed torque signal and the actual torque signal, and driving of the generator-motor is controlled based on a driving control signal from the motor controlling means. Therefore, a linearity of the running driving torque which has a short response time and is quick can be obtained.

A fourth object of the present invention is to provide a controlling apparatus for a hybrid car including assist discrimination means for additionally using or changing over the driving output power of the generator-motor in response to the driving output power of the engine. With the controlling apparatus for a hybrid car according to the fourth object of the present invention, since the controlling apparatus includes the assist discrimination means for additionally using or changing over the driving output power of the generator-motor in response to the driving output power of the engine, even during regeneration control, the running driving torque which exhibits a short response time and is quick can be kept stable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 15 is a circuit diagram of driving means.

DETAILED DESCRIPTION OF THE INVENTION

An embodiment of the present invention is described below with reference to the accompanying drawings. It is to be noted that the drawings should each be viewed in the direction of the reference symbols.

Figure 1:
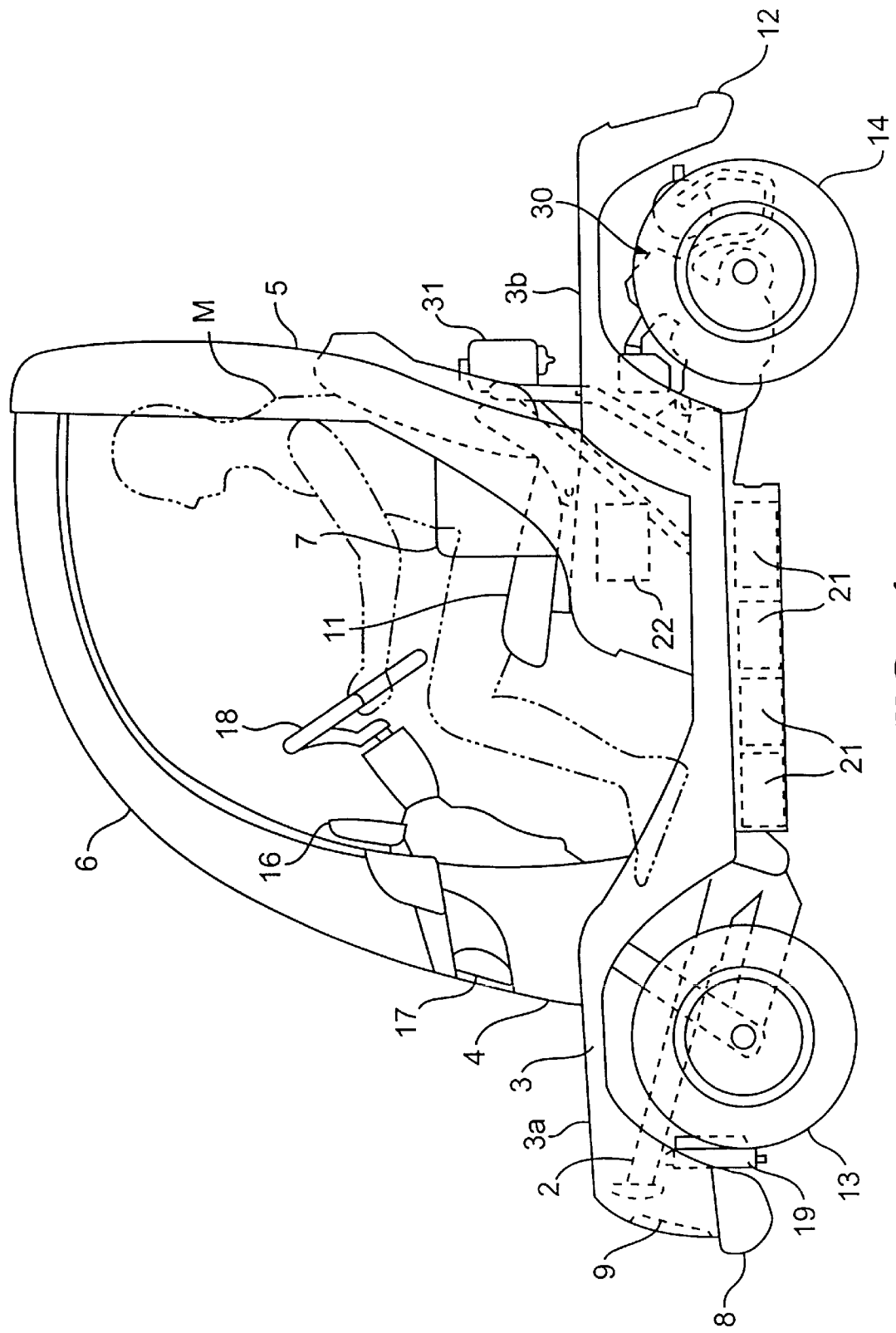
FIG. 1 is a side elevational view of a hybrid car, according to the present invention.

FIG. 1 is a side elevational view of a hybrid car according to the present invention. The hybrid car 1 includes a body frame 2, a body 3 mounted on the body frame 2, a front cover 4 extending upwardly from a front portion of a central portion of the body 3, a center pillar 5 extending upwardly from a rear portion of a central portion of the body 3, a transparent roof 6 extending from an end of the center pillar 5 to the front cover 4, side protectors 7, 7 mounted on the opposite sides of the center pillar 5, a front bumper 8 provided on a front face of the body 3, a radiator grill 9 provided immediately rearwardly of the front bumper 8, a driver's seat 11 mounted in the inside of the center of the body 3, a rear bumper 12 provided at a rear portion of the body 3, front wheels 13, 13 mounted on the body frame 2, rear wheels 14, 14 as driving wheels mounted on the body frame 2, side mirrors 16, 16 provided on the opposite sides of the transparent roof 6, lamps 17, 17 provided on the opposite sides of the front cover 4, a steering wheel 18 provided at the center of the body 3, a radiator 19 mounted rearwardly of the radiator grill 9, batteries 21 mounted at a central portion of the body frame 2, a control unit 22 disposed below the driver's seat 11, and a driving system unit 30 carried at a rear portion of the body frame 2. Reference symbol M denotes a driver.

It is to be noted that reference symbol 3a denotes a front deck portion and 3b denotes a rear deck portion and a person can ride on the deck portions 3a, 3b and can enter to the driver's seat 11 readily from forwardly and from rearwardly through the deck portions 3a, 3b.

Figure 2:
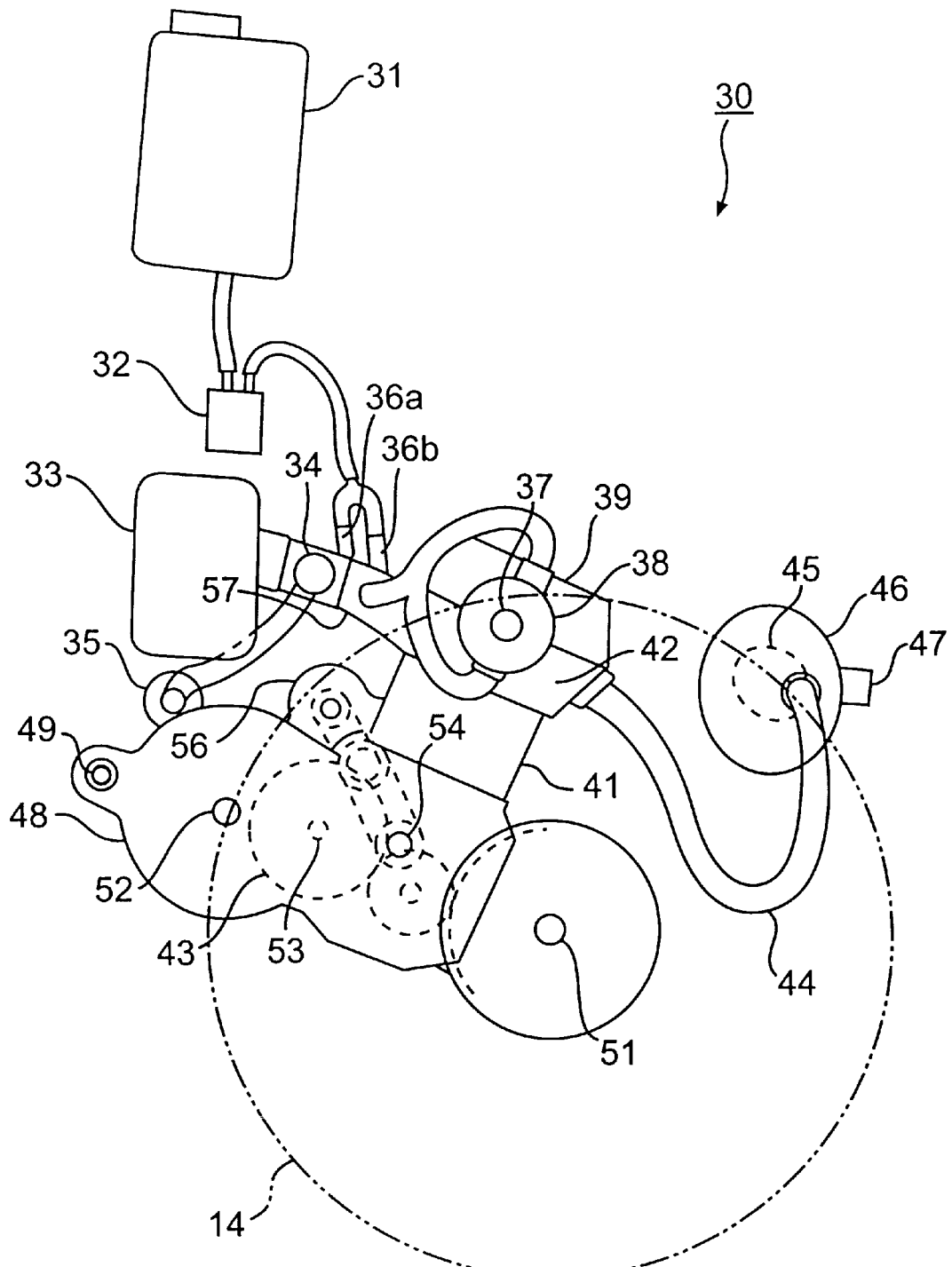
FIG. 2 is a side elevational view of a driving system unit of the hybrid car.

FIG. 2 is a side elevational view of the driving system unit of the hybrid car according to the present invention and shows principal components of the driving system unit 30. In particular, reference symbol 31 denotes a fuel tank, 32 a fuel pump, 33 an air cleaner, 34 a throttle pulley, 35 a servo motor, 36a an additional supplying injector, 36b a main injector, 37 a camshaft, 38 a mechanical pump which rotates integrally with the cam shaft 37, 39 a head cover, 41 a cylinder block, 42 a cylinder head, 43 a three-phase brushless motor as a generator-motor, 44 an exhaust pipe, 45 a metal catalyzer, 46 a muffler, 47 a tail pipe, 48 a cone-type non-stage transmission as a transmission, 49 a pivot shaft, 51 a rear axle, 52 a non-stage transmission shaft, 53 a motor shaft as a driving force joining point, 54 a crankshaft, 56 a sel-motor, and 57 an intake manifold.

Figure 3:
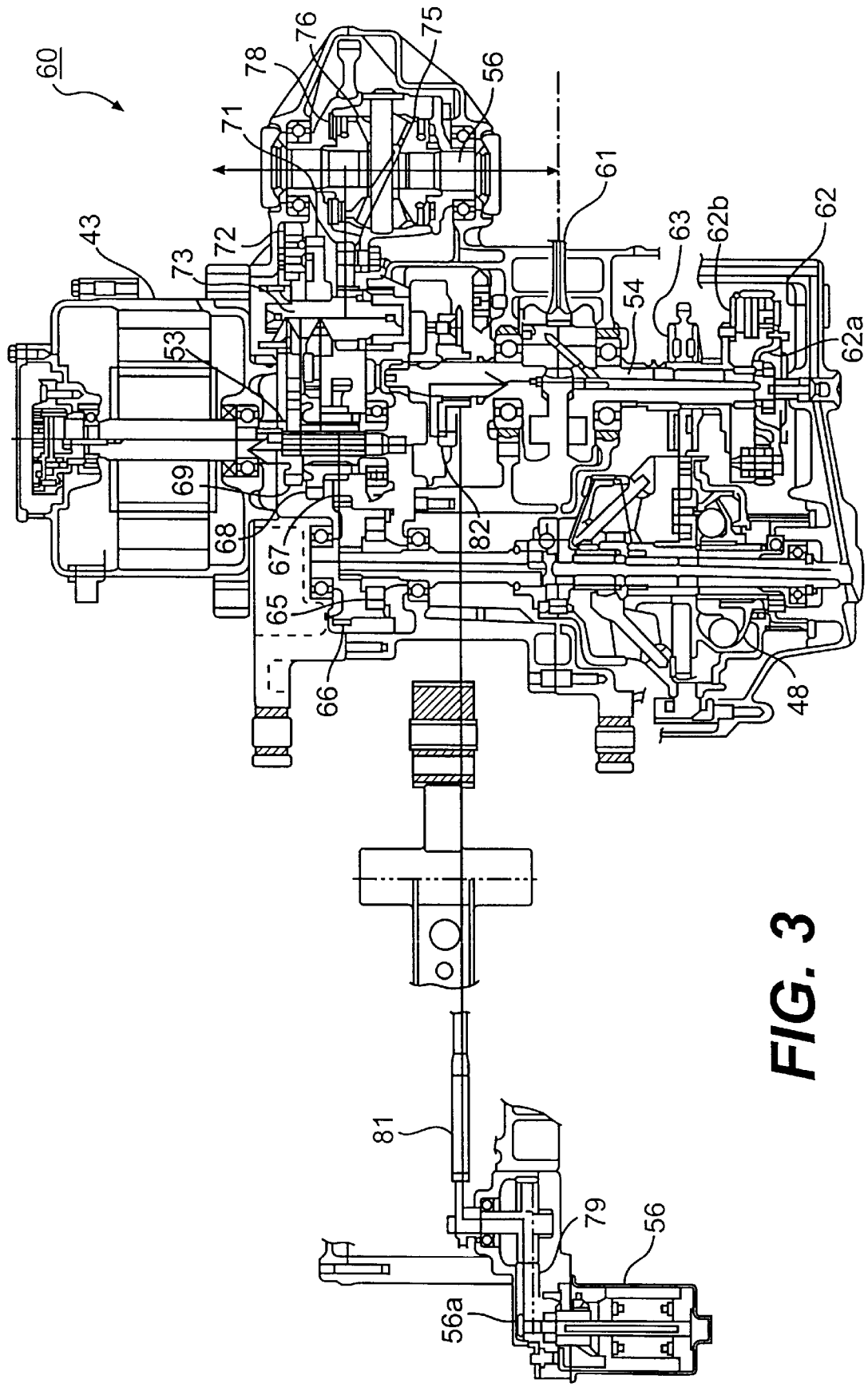
FIG. 3 is a side elevational view of a driving force transmission apparatus of the hybrid car.

FIG. 3 is a sectional view of a driving force transmission apparatus of the hybrid car according to the present invention. The driving force transmission apparatus 60 of the hybrid car 1 includes an engine 61, an inner member 62a of a centrifugal clutch 62 mounted on the crankshaft 54 of the engine 61, an outer member 62b of the centrifugal clutch 62 with and from which the inner member 62a is engaged and disengaged, the cone-type non-stage transmission 48 connected to the outer member 62b through a torque limiter 63, a first transmission gear 66 connected to the cone-type non-stage transmission 48 through a one-way clutch 65, the motor 43 for driving the hybrid car 1 together with the engine 61, the motor shaft 53 which serves as a joining point of driving forces, a second transmission gear 67 mounted on the motor shaft 53 and held in meshing engagement with the first transmission gear 66, an engine side first helical gear 68 and a motor side first helical gear 69 mounted on the motor shaft 53, an engine side second helical gear 71 and a motor side second helical gear 72 held in meshing engagement with the gears 68, 69, respectively, a countershaft 73 for supporting the gears 71, 72, pressure sensors 74a, 74b (refer to FIG. 8) mounted at the opposite ends of the countershaft 73, an output gear 75 mounted on the countershaft 73, a propeller shaft 76 connected to the output gear 75, the rear axle 51 connected to the propeller shaft 76 through a differential gear 78, and the rear wheels 14 (refer to FIG. 1) mounted on the rear axle 51. The sel-motor 56 rotates the crankshaft 54 connected to a motor shaft 56a thereof through a belt 79, a chain 81 and a one-way clutch 82.

Figure 4:
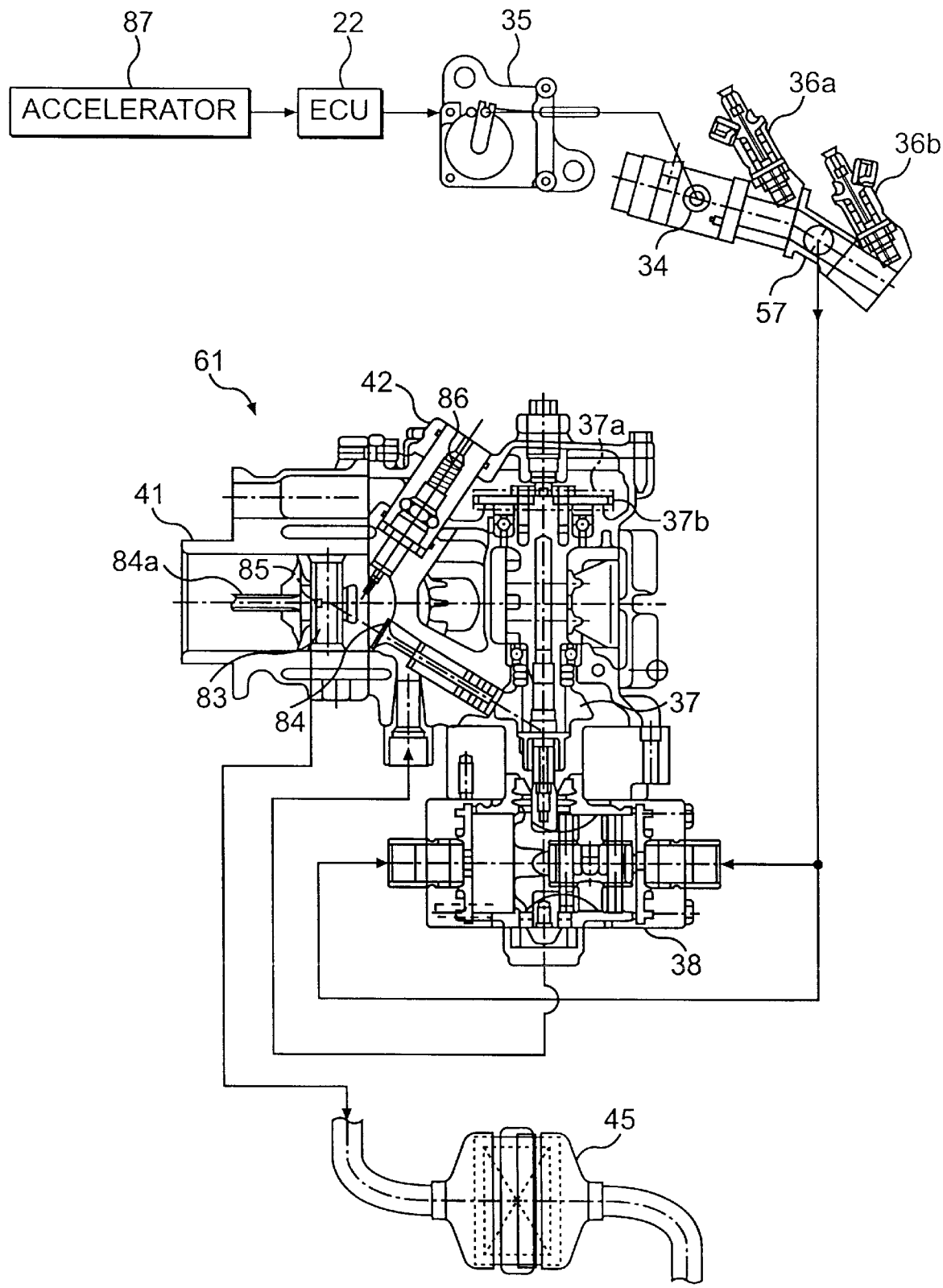
FIG. 4 is a sectional view of an engine of the hybrid car.

FIG. 4 is a sectional view of the engine of the hybrid car according to the present invention. The engine 61 includes the cylinder block 41, a piston 83 fitted for back and forth cylinder block 41, a connecting rod 83 is mounted, the cylinder head 42 movement in the 84a on which the piston fitted on the cylinder block 41, an intake auxiliary valve 84 and an exhaust valve 85 provided on the cylinder head 42, and a spark plug 86 mounted on the cylinder head 42, and includes the mechanical pump 38 which rotates coaxially with the camshaft 37. It is to be noted that reference symbol 37a denotes a cam chain, and 37b denotes a cam sprocket wheel.

By adjusting the throttle pulley 34 through the control unit 22 and the servo motor 35 by an opening of an accelerator 87, the supply amount of fuel air mixture is adjusted to control the output power of the engine 61. During running only with the motor, if a request for the engine output power is issued when the accelerator 87 is open, the throttle pulley 34 is tightened by the servo motor 35 irrespective of the accelerator opening to make the starting of the engine 61 better. Meanwhile, part of the fuel air mixture, supplied from the injector 36a, is branched from the intake manifold 57 and additionally supplied by the mechanical pump 38 so as to be injected into the cylinder block 41 from the intake auxiliary valve 84 immediately prior to ignition to augment the engine output power.

Figure 5A:
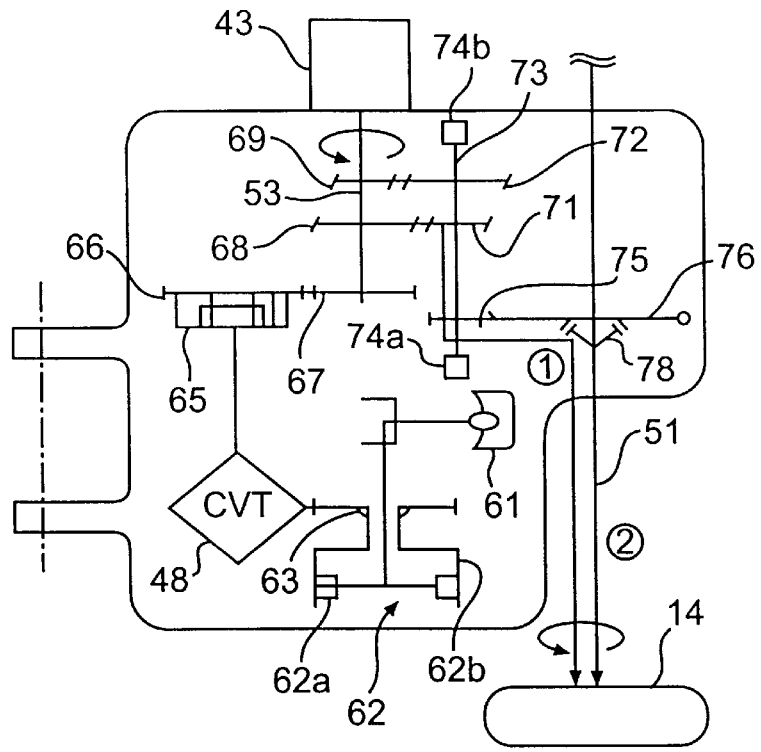
FIG. 5 is a diagram illustrating a first operation of the driving force transmission apparatus.
Figure 5B:
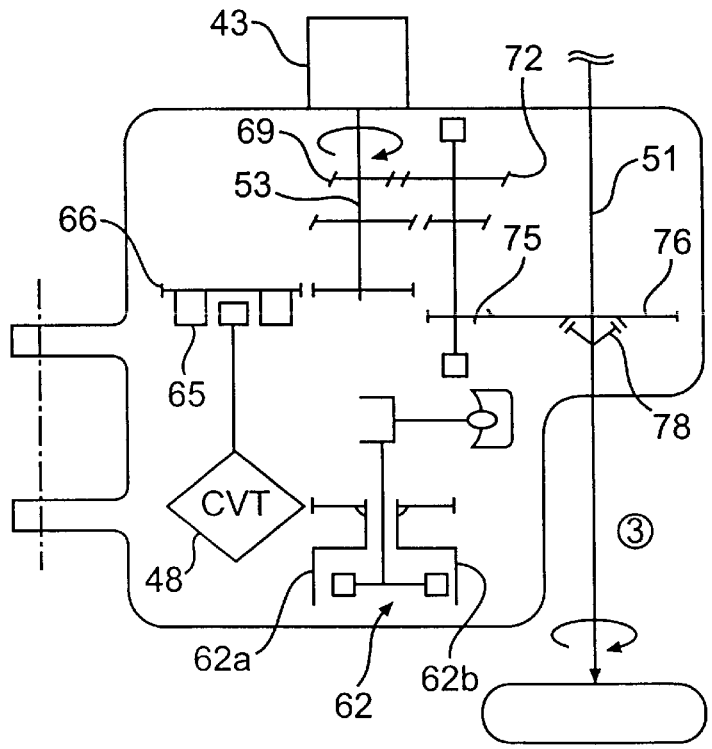

Operation of the driving force transmission apparatus 60 of the hybrid car 1 described above is described with reference to FIGS. 5(a), 5(b), 6(a), 6(b), and 7. FIGS. 5(a) and 5(b) are diagrammatic views of a first operation of the driving force transmission apparatus according to the present invention. FIG. 5(a) illustrates a case wherein the rear wheels 14 are driven by a joined force of the engine 61 and the motor 43. The engine 61 drives the rear wheels 14 through the inner member 62a of the centrifugal clutch 62, outer member 62b, cone-type non-stage transmission 48, one-way clutch 65, first transmission gear 66, second transmission gear 67 and engine side first helical gear 68 mounted on the motor shaft 53 which makes a joining point with the driving force of the motor 43, engine side second helical gear 71, output gear 75, propeller shaft 76, differential gear 78 and rear axle 51 in this order as indicated by an arrow labeled ①.

The motor 43 drives the rear wheels 14 through the motor shaft 53, motor side first helical gear 69, motor side second helical gear 72, output gear 75, propeller shaft 76, differential gear 78 and rear axle 51 in this order as indicated by an arrow labeled ②. The driving force of the engine 61 and the driving force of the motor 43 are joined together at the motor shaft 53.

When the hybrid car 1 is to be started with the engine 61, the torque can be transmitted gradually and smoothly through the centrifugal clutch 62 to start the hybrid car 1. Since the centrifugal clutch 62 is disposed in a stage preceding to the cone-type non-stage transmission 48, it may have a smaller clutch capacity than where it is disposed in a stage next to the cone-type non-stage transmission 48. On the contrary, as viewed from the cone-type non-stage transmission 48 side, since it need not receive an excessive torque of the engine 61 directly, also protection of the cone-type non-stage transmission 48 can be anticipated. Particularly where the clutch employed is of the wet type, since the contacting pressure is reduced, if the centrifugal clutch 62 is disposed in a stage following the cone-type non-stage transmission 48, then a large clutch capacity is required and the apparatus becomes large in size. Since the cone-type non-stage transmission 48 is connected to the outer member 62b of the centrifugal clutch 62 through the torque limiter 63, the engine 61 need not receive back torque from the rear wheels 14.

FIG. 5(b) illustrates a case wherein the rear wheels 14 are driven only with the motor 43. The motor 43 drives the rear wheels 14 through the motor shaft 53, motor side first helical gear 69, motor side second helical gear 72, output gear 75, propeller shaft 76, differential gear 78, and rear axle 51 as indicated by an arrow labeled ③. Since the engine 61 is stopped, the one-way clutch 65 is put into an open condition. Since the one-way clutch 65 is disposed immediately prior to the joining point with the driving force of the motor 43, when the rear wheels 14 are driven only with the motor 43, the cone-type non-stage transmission 48, the outer member 62b of the centrifugal clutch 62 and so forth which serve as the load side are not rotated together at all. Accordingly, the consumption of the batteries 21 can be saved, and a longer operation time can be secured.

Figure 6A:
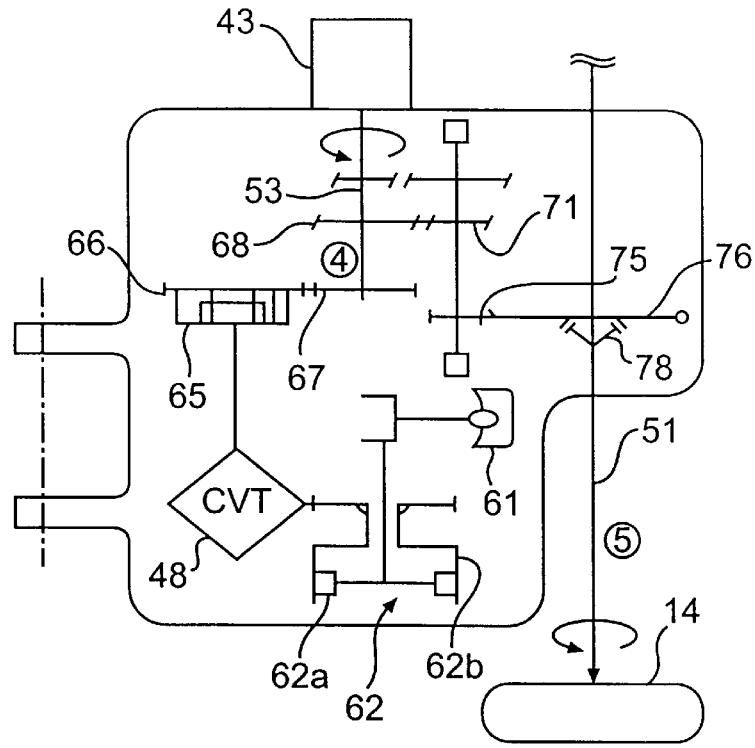
FIG. 6 is a diagram illustrating a second operation of the driving force transmission apparatus.
Figure 6B:
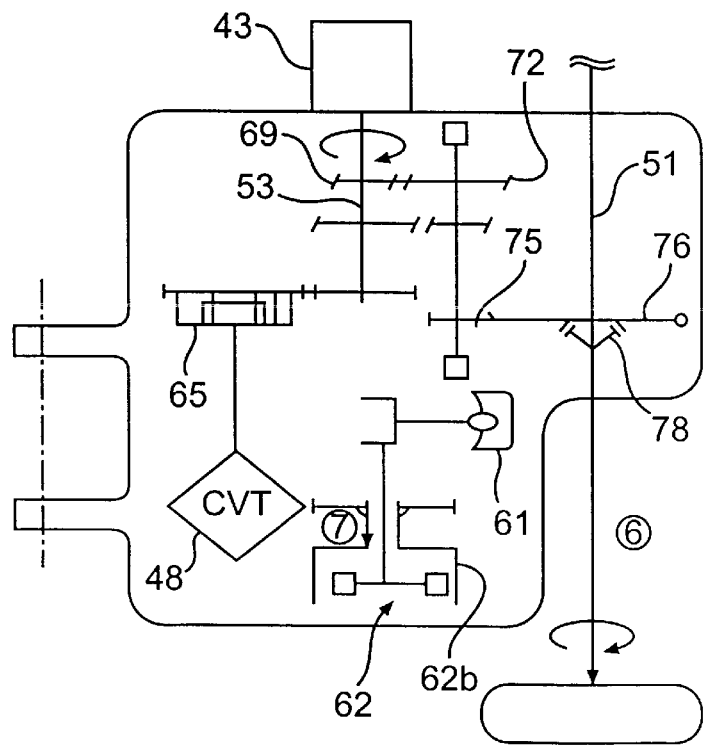

FIGS. 6(a) and 6(b) are diagrammatic views of a second operation of the driving power transmission apparatus according to the present invention. FIG. 6(a) illustrates a case wherein the rear wheels 14 are driven only with the engine 61. The engine 61 drives the motor shaft 53 through the inner member 62a of the centrifugal clutch 62, outer member 62b, cone-type non-stage transmission 48, one-way clutch 65, first transmission gear 66, and second transmission gear 67 in this order as indicated by an arrow labeled ④. In other words, the motor 43 can act as a generator to charge the batteries 21.

Further, the engine 61 drives the rear wheels 14 through the engine side first helical gear 68, the engine side second helical gear 71, output gear 75, propeller shaft 76, differential gear 78, and rear axle 51 in this order as indicated by an arrow labeled ⑤.

FIG. 6(b) illustrates a case wherein the hybrid car 1 is reversely driven to run backwardly by the motor 43. The motor 43 is driven to rotate reversely and the reverse rotation is transmitted to the rear wheels 14 through the motor shaft 53, motor side first helical gear 69, motor side second helical gear 72, output gear 75, propeller shaft 76, differential gear 78, and rear axle 51 in this order, as indicated by an arrow labeled ⑥ to reversely rotate the rear wheels 14. Since the motor 43 rotates reversely while the engine 61 is stopped, the one-way clutch 65 is connected and the driving force of the motor 43 is transmitted up to the cone-type non-stage transmission 48 and the outer member 62b of the centrifugal clutch 62 as indicated by an arrow labeled ⑦, but the engine 61 is not rotated together due to the presence of the centrifugal clutch 62.

Figure 7:
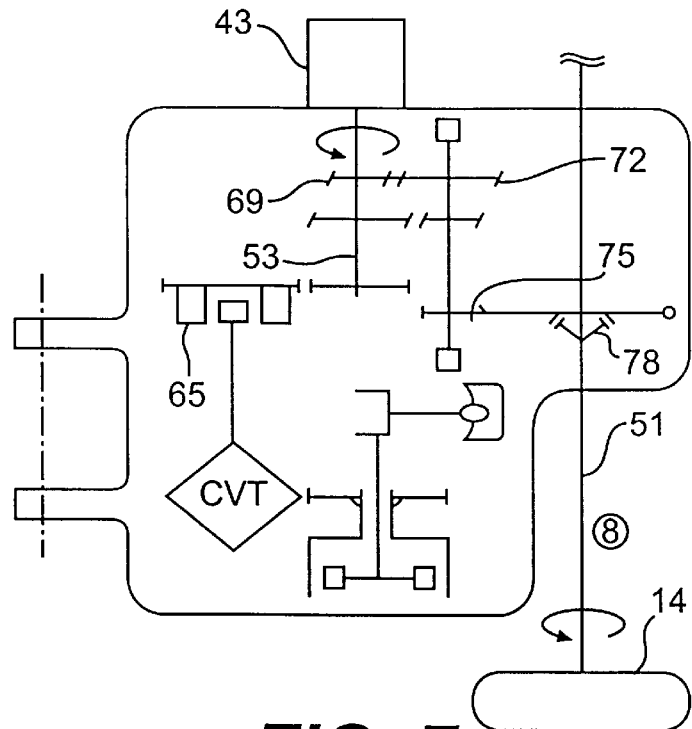
FIG. 7 is a diagram illustrating a third operation of the driving force transmission apparatus.

FIG. 7 is a diagrammatic view illustrating a third operation of the driving power transmission apparatus according to the present invention, and illustrates a flow of driving force upon deceleration of the hybrid car 1. Upon deceleration of the hybrid car 1, driving force is transmitted to the motor 43 through the rear wheels 14, rear axle 51, differential gear 78, propeller shaft 76, motor side second helical gear 72, motor side first helical gear 69, and motor shaft 53 in this order as indicated by an arrow labeled ⑧, and the motor 43 acts as a generator. In this instance, since the one-way clutch 65 is put into an open condition, the driving force upon deceleration can be transmitted effectively to the motor 43 and the batteries 21 can be charged.

Figure 8:
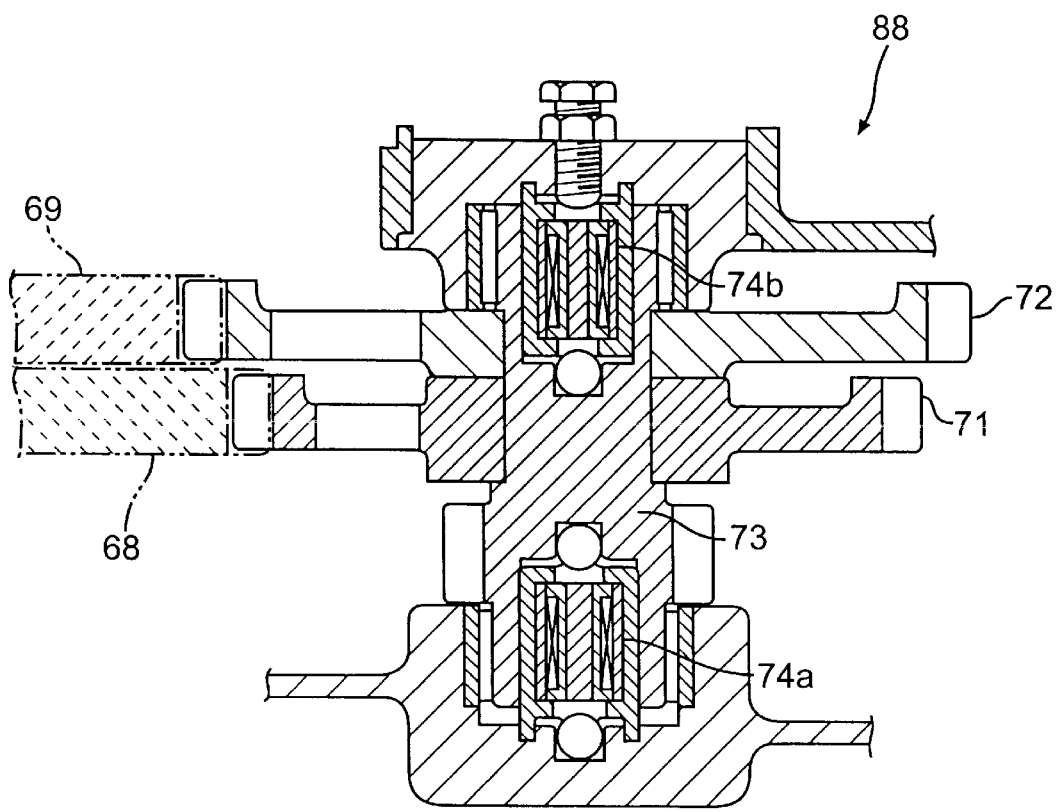
FIG. 8 is a sectional view of a torque sensor unit of the driving force transmission apparatus.

FIG. 8 is a sectional view of the torque sensor unit of the driving force transmission apparatus according to the present invention. The torque sensor unit 88 includes the countershaft 73, the pressure sensors 74a, 74b mounted at the opposite ends of the countershaft 73, the engine side second helical gear 71 and the motor side second helical gear 72 mounted on the countershaft 73, and the engine side first helical gear 68 and the motor side first helical gear 69 held in meshing engagement with the gears 71, 72, respectively. An operation of the torque sensor unit 88 is described below with the following figure.

Figure 9:
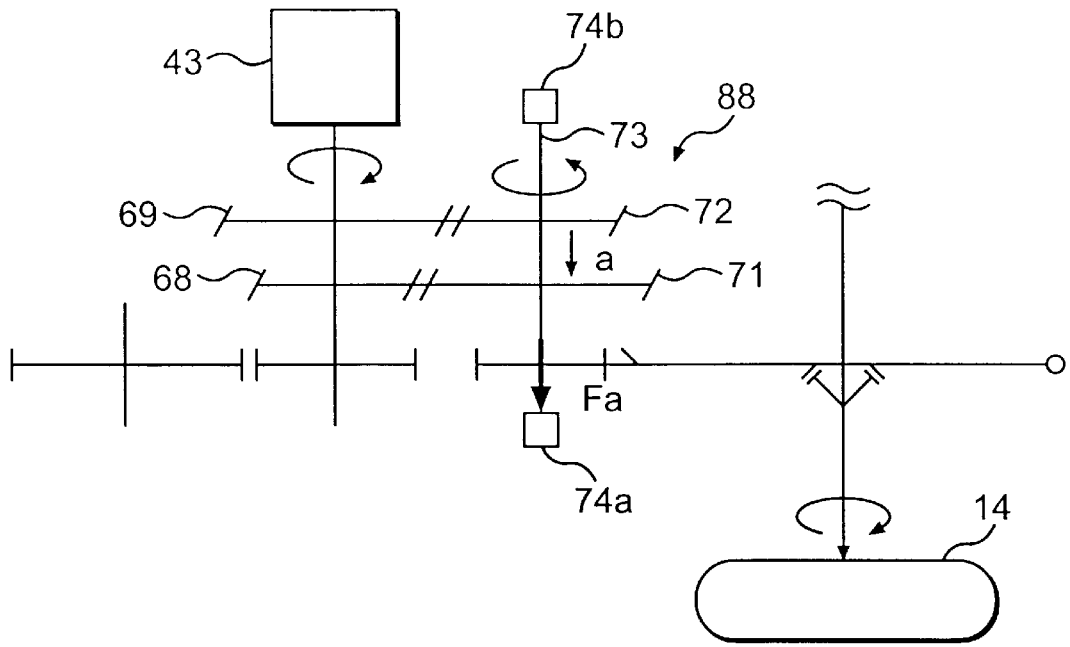
FIG. 9 is a diagram illustrating operation of the torque sensor unit.
Figure 9:
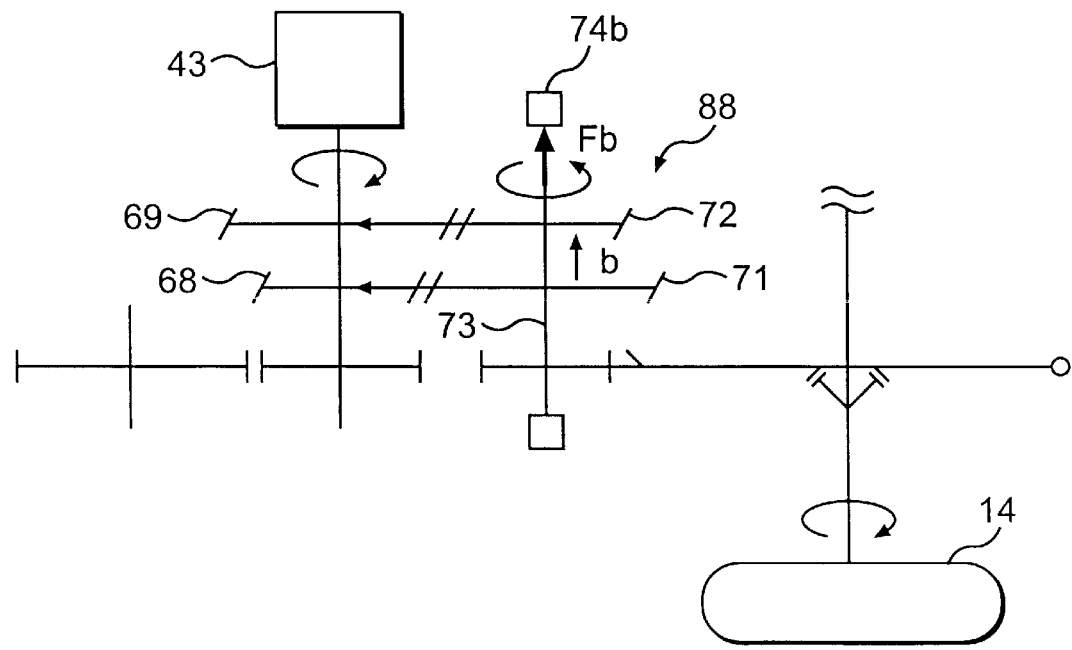

FIGS. 9(a) and 9(b) are diagrammatic views illustrating operation of the torque sensor unit 88 according to the present invention.

FIG. 9(a) illustrates operation of the torque sensor unit 88 upon acceleration. Upon acceleration, driving force is transmitted from the engine 61 or the motor 43 to the rear wheels 14. In particular, since the engine side first helical gear 68 and the motor side first helical gear 69 serve as the driving side while the engine side second helical gear 71 and the motor side second helical gear 72 serve as the driven side, the gears 71, 72 cause the countershaft 73 to generate a stress Fa as indicated by an arrow labeled a. This stress Fa is detected by the pressure sensor 74a.

FIG. 9(b) illustrates operation of the torque sensor unit 88 upon deceleration. Upon deceleration, driving force is transmitted from the rear wheels 14 to the motor 43. In particular, since the engine side second helical gear 71 and the motor side second helical gear 72 serve as the driving side while the engine side first helical gear 68 and the motor side first helical gear 69 serve as the driven side, the gears 68, 69 cause the countershaft 73 to generate a stress Fb as indicated by an arrow labeled b. This stress Fb is detected by the pressure sensor 74b.

By detecting the magnitude and the direction of transmission of the driving force using the pressure sensors 74a, 74b and by using the outputs of the pressure sensors 74a, 74b for feedback control, the driving forces of the engine 61 and the motor 43 can be used efficiently.

Since the torque sensor unit 88 is composed of the countershaft 73, pressure sensors 74a, 74b mounted at the opposite ends of the countershaft 73, engine side second helical gear 71 and motor side second helical gear 72 mounted on the countershaft 73, and engine side first helical gear 68 and motor side first helical gear 69 held in meshing engagement with the gears 71, 72, respectively, a torque detection mechanism which is compact and highly reliable can be implemented.

Figure 30:
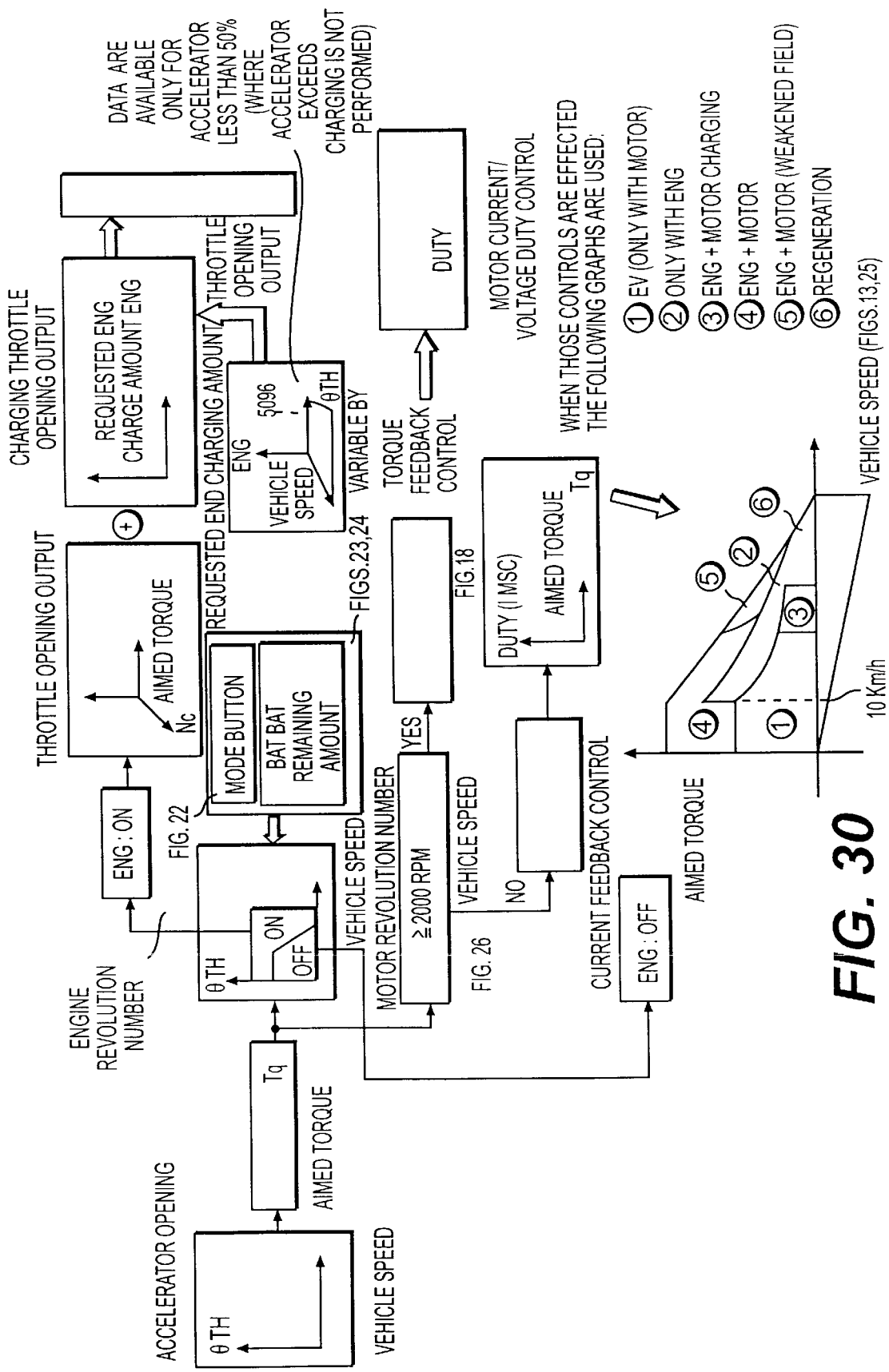
FIG. 30 is a diagram of a basic concept of control of the motor controlling apparatus for a hybrid car.

FIG. 30 is a diagram illustrating a basic control concept of the motor controlling apparatus for the hybrid car according to the present invention.

Figure 10:
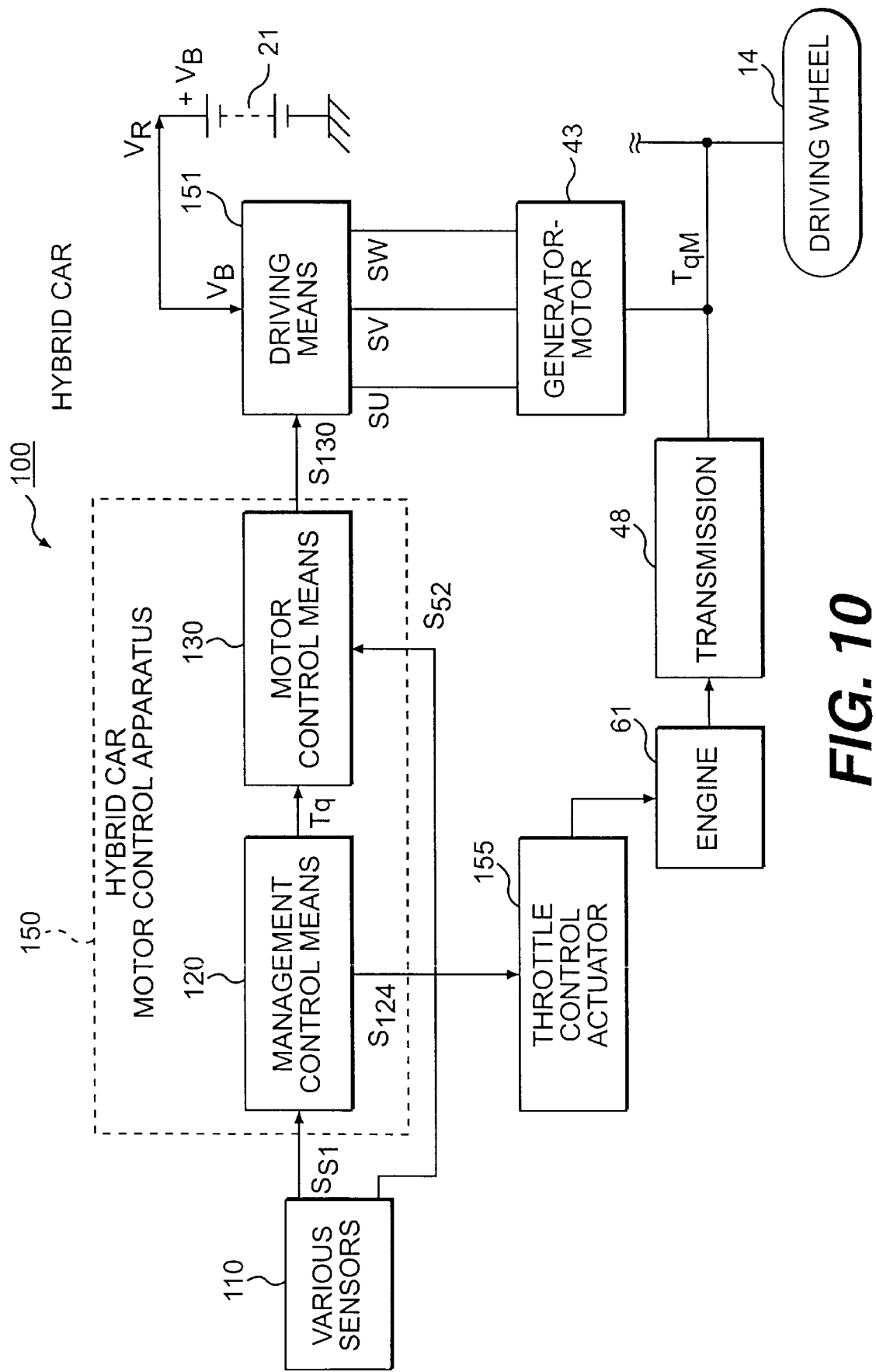
FIG. 10 is a block diagram of an entire construction of a form of the hybrid car.

FIG. 10 is a block diagram representing the hybrid car 100 according to the present invention. Referring to FIG. 10, the hybrid car 100 includes rear wheels 14, a generator-motor 43, a cone-type non-stage transmission 48, an engine 61, various sensors 110, batteries 21, a hybrid car motor control apparatus 150, driving means 151, and a throttle control actuator 155.

The various sensors 110 output a sensor signal $S_{s1}$ to management control means 120 of the hybrid car motor control apparatus 150.

The management control means 120 outputs a torque instruction value $T_q$ obtained by processing based on the sensor signal $S_{s1}$ to motor control means 130 and outputs a throttle aimed opening signal $S_{124}$ to the throttle control actuator 155.

The motor control means 130 outputs a control signal $S_{130}$ obtained by processing based on the torque instruction value $T_q$ and a sensor signal $S_{s2}$ to the driving means 151.

The driving means 151 outputs driving signals ($S_U$, $S_V$, $S_W$) obtained by processing the control signal $S_{130}$ and a battery voltage $V_b$ to the generator-motor 43.

Figure 15:
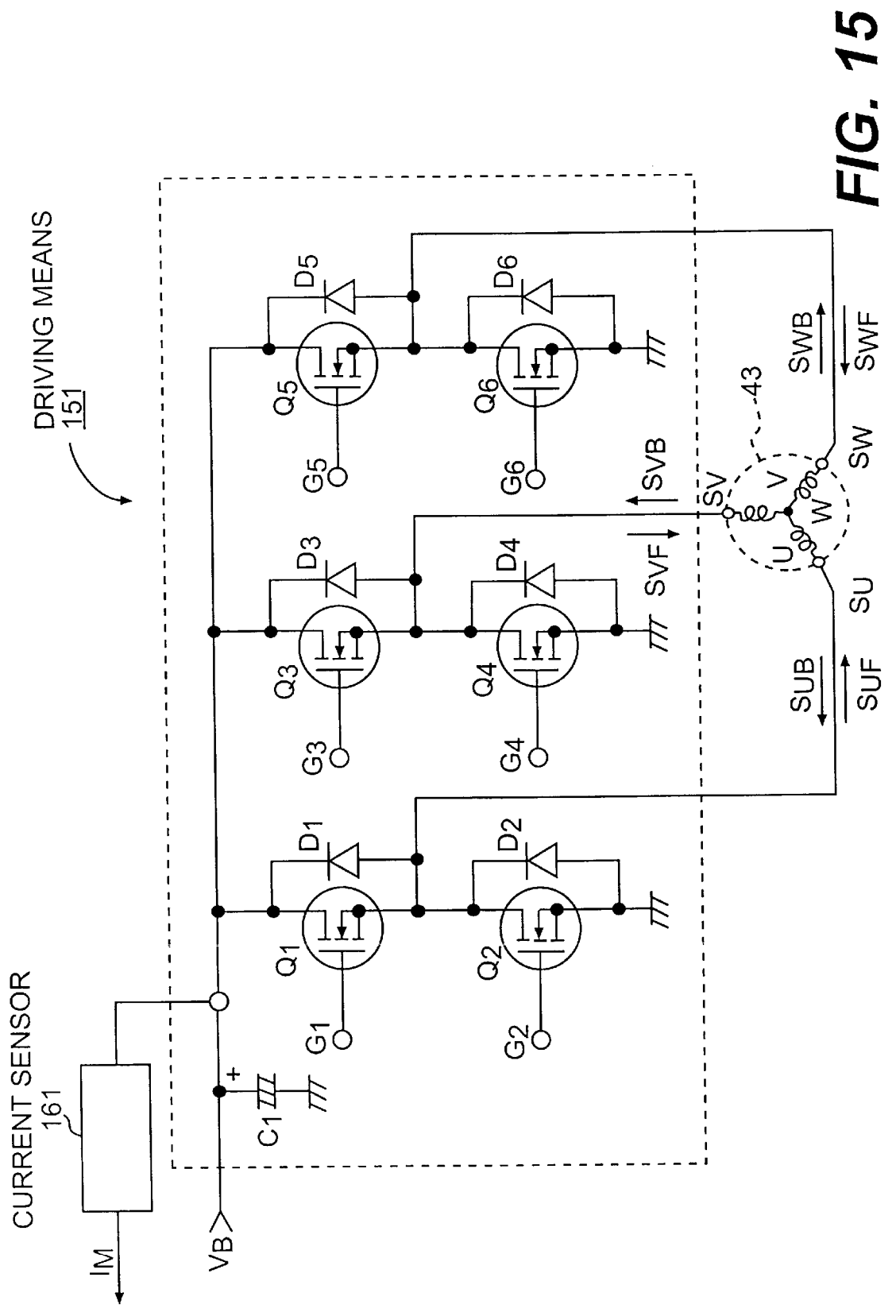

The generator-motor 43 is driven or regenerates when the driving signals ($S_U$, $S_V$, $S_W$) are provided to coils of a U phase, a V phase and a W phase illustrated in FIG. 15. The generator-motor 43 either outputs motor torque $T_{qM}$ to the driving wheels 14 or charges the batteries 21 with regeneration power $V_r$.

Figure 20:
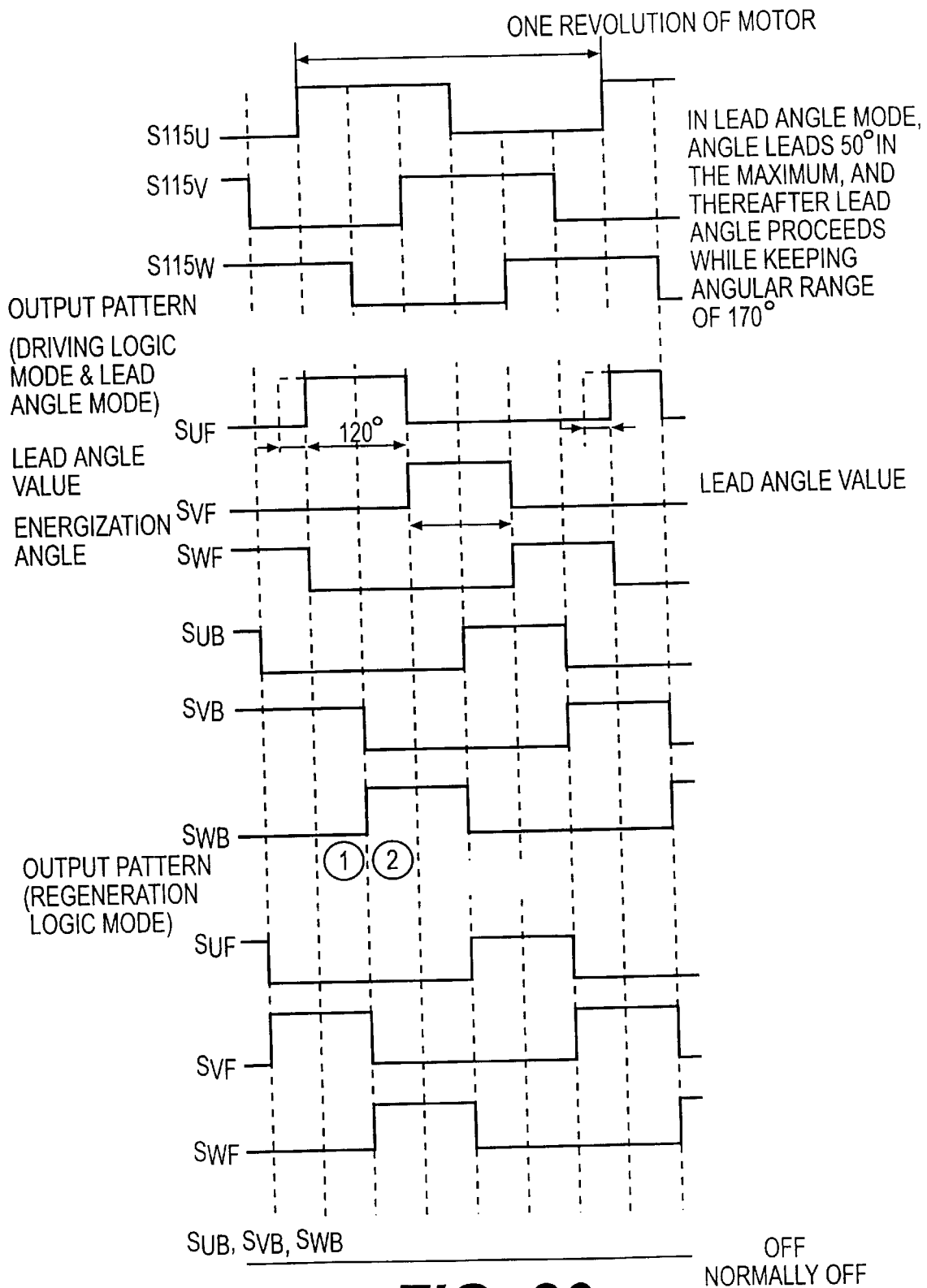
FIG. 20 is a waveform diagram of three-phase driving signals of the driving means.

Here, the driving signals $S_U$, $S_V$, $S_W$ are described with reference to FIG. 20. Referring to FIG. 20, reference symbols $S_{UF}$, $S_{VB}$, $S_{WF}$, $S_{UB}$, $S_{VF}$, $S_{WB}$ denote the directions of the driving signals $S_U$, $S_V$, $S_W$ illustrated in FIG. 15. For example, reference symbol $S_{UF}$ denotes a driving signal $S_U$ which is supplied from the batteries 21 to the U-phase of the generator-motor 43 when an FET $Q_1$ of the driving means 151 is on, and $S_{UB}$ denotes a driving signal $S_U$ which flows from the U-phase of the generator-motor 43 to the ground when another FET $Q_2$ of the driving means 151 is on.

Similarly, a driving signal $S_V$ which flows from the batteries 21 to the V-phase of the generator-motor 43 when a further FET $Q_3$ of the driving means 151 is on is denoted by $S_{VB}$. A driving signal $S_V$ which flows from the V-phase of the generator-motor 43 to the ground when a still further FET $Q_4$ is on is denoted by $S_{VB}$. A driving signal $S_W$ which is supplied from the batteries 21 to the W phase of the generator-motor 43 when a yet further FET $Q_5$ of the driving means 151 is on is denoted by $S_{WF}$. A driving signal $S_W$ which flows from the W phase of the generator-motor 43 to the ground when a yet further FET $Q_6$ is on is denoted by $S_{WB}$.

As illustrated in FIG. 20, within a period ①, the FET $Q_1$ and the FET $Q_4$ are in an on state, and the driving signal $S_{UF}$ flows to the U phase of the generator-motor 43 through the batteries 21→FET $Q_1$, and the driving signal $S_{VB}$ flows to the ground through the V phase of the generator-motor 43→FET $Q_4$.

In this manner, the current (driving signal) within the period ① flows from the U phase of the U phase, V phase and W phase of the three-phase coils of the generator-motor 43 to the V phase. This is synchronized with a rising edge of a magnetic pole position signal PM (115U) from a motor magnetic pole sensor 115 of the generator-motor 43. In short, the signal $S_{115U}$ detects an energization timing to the U phase, and control to cause current to flow from the coil of the U phase to the coil of the V phase is executed by UVW energization pattern generation means 135.

As also illustrated in FIG. 20, within another period ②, the FET $Q_6$ is turned on in place of the FET $Q_4$ (the FET $Q_4$ is in an off state) and the driving signal $S_{WB}$ flows, and the flow of the current (driving signal) from the U phase to the V phase is switched from the U phase to the W phase.

Figure 11:
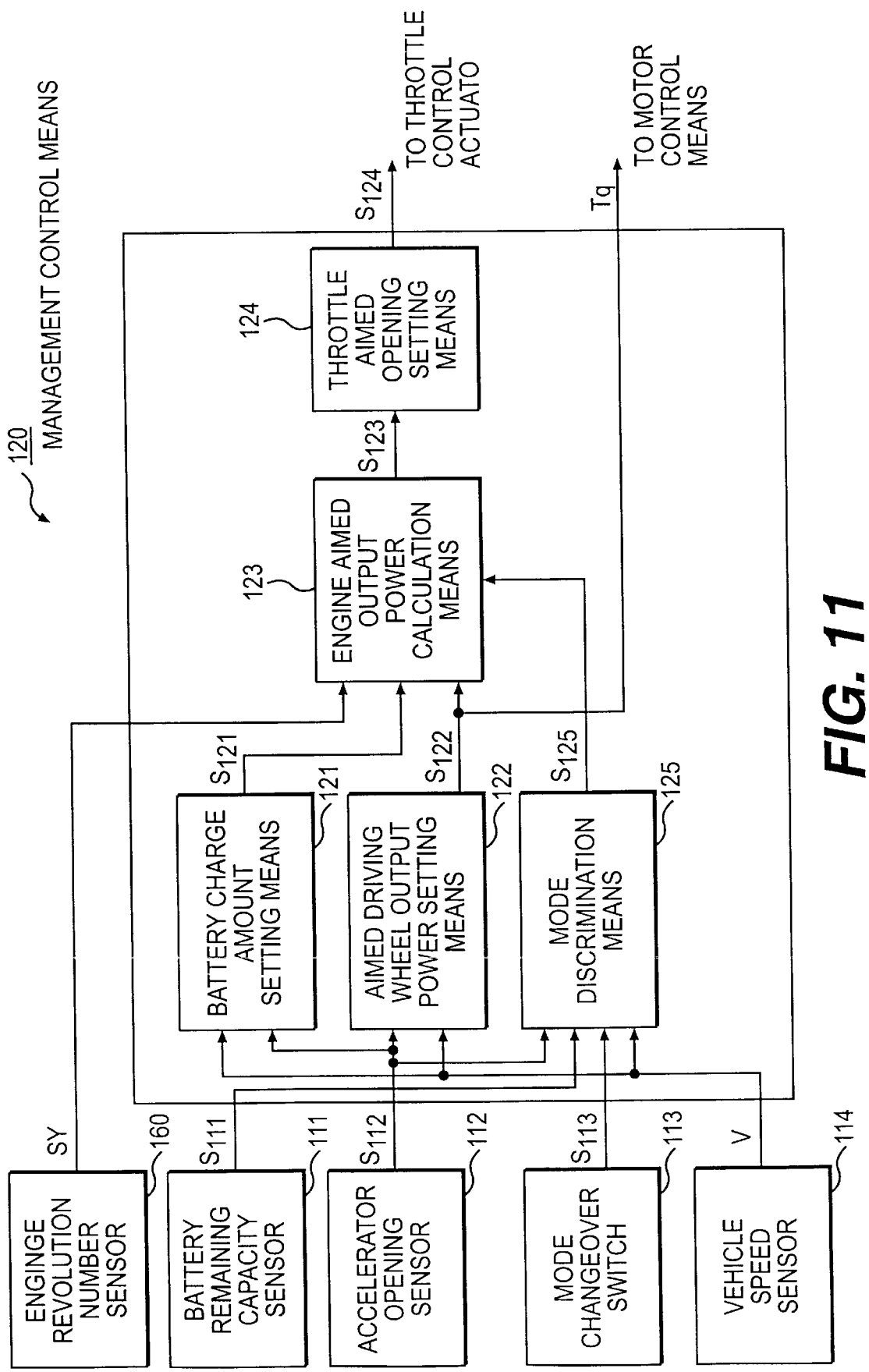
FIG. 11 is a block diagram of a construction of an important part of a form of management control means of a motor controlling apparatus for the hybrid car.
Figure 21:
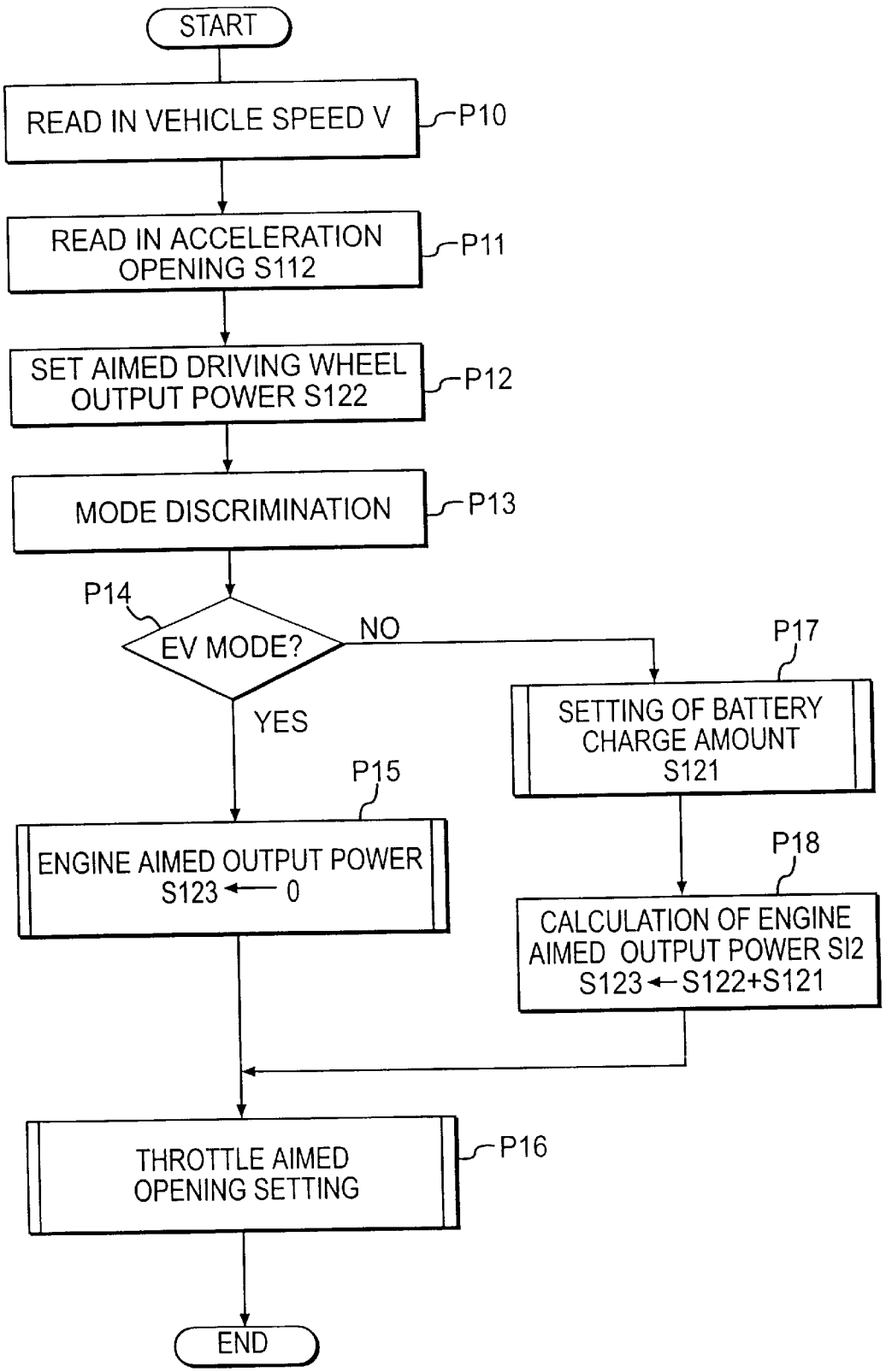
FIG. 21 is a flow chart of an operation of the management control means.

FIG. 11 is a block diagram of an important part of a form of the management control means of the motor controlling apparatus for a hybrid car, according to the present invention. Referring to FIG. 11, the management control means 120 includes battery charge amount setting means 121, aimed driving wheel output power setting means 122, engine aimed output power calculation means 123, throttle aimed opening setting means 124, and mode discrimination means 125. It is to be noted that the operation described below is illustrated in an operation flow chart of the management control means 120 in FIG. 21.

An engine revolution number sensor 160 detects a revolution number of the engine and supplies a revolution number signal $S_Y$ to the engine aimed output power calculation means 123. A battery remaining capacity sensor 111 outputs a battery remaining capacity signal $S_{111}$ obtained by detecting the remaining capacity of the batteries 21 to the mode discrimination means 125.

The battery charge amount setting means 121 is formed from a memory such as a ROM. The ROM stores charging engine aimed output data required for the batteries 21. The data are indexed to an accelerator opening signal $S_{112}$ and a vehicle speed signal V. The battery charge amount setting means 121 outputs a battery charge amount signal $S_{121}$ obtained by reading out the charging engine aimed output data using the accelerator opening signal $S_{112}$ and the vehicle speed signal V as an address. The battery charge amount signal $S_{121}$ is sent to the engine aimed output power calculation means 123.

It is to be noted that the data stored in the ROM are stored only for a region wherein the accelerator opening is less than 50%, so that engine charging may be performed only in a region in which the engine efficiency is high.

An accelerator opening sensor 112 outputs the accelerator opening signal $S_{112}$ which relates to a detected operation amount (opening) of an accelerator pedal. The accelerator opening signal $S_{112}$ is received by the battery charge amount setting means 121, the aimed driving wheel output power setting means 122 and the mode discrimination means 125.

A vehicle speed sensor 114 outputs the vehicle speed signal V obtained by detecting the vehicle speed. The vehicle speed signal V is received by the battery charge amount setting means 121, the aimed driving wheel output power setting means 122 and the mode discrimination means 125.

The aimed driving wheel output power setting means 122 is formed from a memory such as a ROM which stores aimed driving wheel output data (torque $T_q$) corresponding to the accelerator opening signal $S_{112}$ and the vehicle speed signal V. The aimed driving wheel output power setting means 122 outputs an aimed driving wheel output signal $S_{122}$ (torque instruction value $T_q$) obtained by reading out the aimed driving wheel output data using the accelerator opening signal $S_{112}$ and the vehicle speed signal V as an address. The aimed driving wheel output signal $S_{122}$ is received by the engine aimed output power calculation means 123 and the motor control means 130.

A mode changeover switch 113 (refer to FIG. 12) outputs a mode signal $S_{113}$, obtained by changing over the running mode of the hybrid car 100, to the mode discrimination means 125.

The mode discrimination means 125 outputs a mode discrimination signal $S_{125}$, obtained by performing mode discrimination based on the battery remaining capacity signal $S_{111}$, the accelerator opening signal $S_{112}$, the mode signal $S_{113}$ and the vehicle speed signal V, to the engine aimed output power calculation means 123.

The engine aimed output power calculation means 123 calculates the engine aimed outputs, previously stored in the ROM, using the revolution number signal $S_Y$ and the aimed driving wheel output signal $S_{122}$ ($T_q$) as an address. Then, the engine aimed output power calculation means 123 calculates an engine aimed output power for battery charging based on the battery charge amount signal $S_{121}$ and the mode discrimination signal $S_{125}$, and outputs an engine aimed output power signal $S_{123}$, obtained by adding the two engine aimed output powers, to the throttle aimed opening setting means 124.

The throttle aimed opening setting means 124 in formed from a memory, such as a ROM, and stores throttle aimed opening data corresponding to the engine aimed output power signal $S_{123}$. The throttle aimed opening setting means 124 outputs a throttle aimed opening signal $S_{124}$, obtained by reading out the throttle aimed opening data using the engine aimed output power signal $S_{123}$ as an address, to the throttle control actuator 155.

Figure 12:
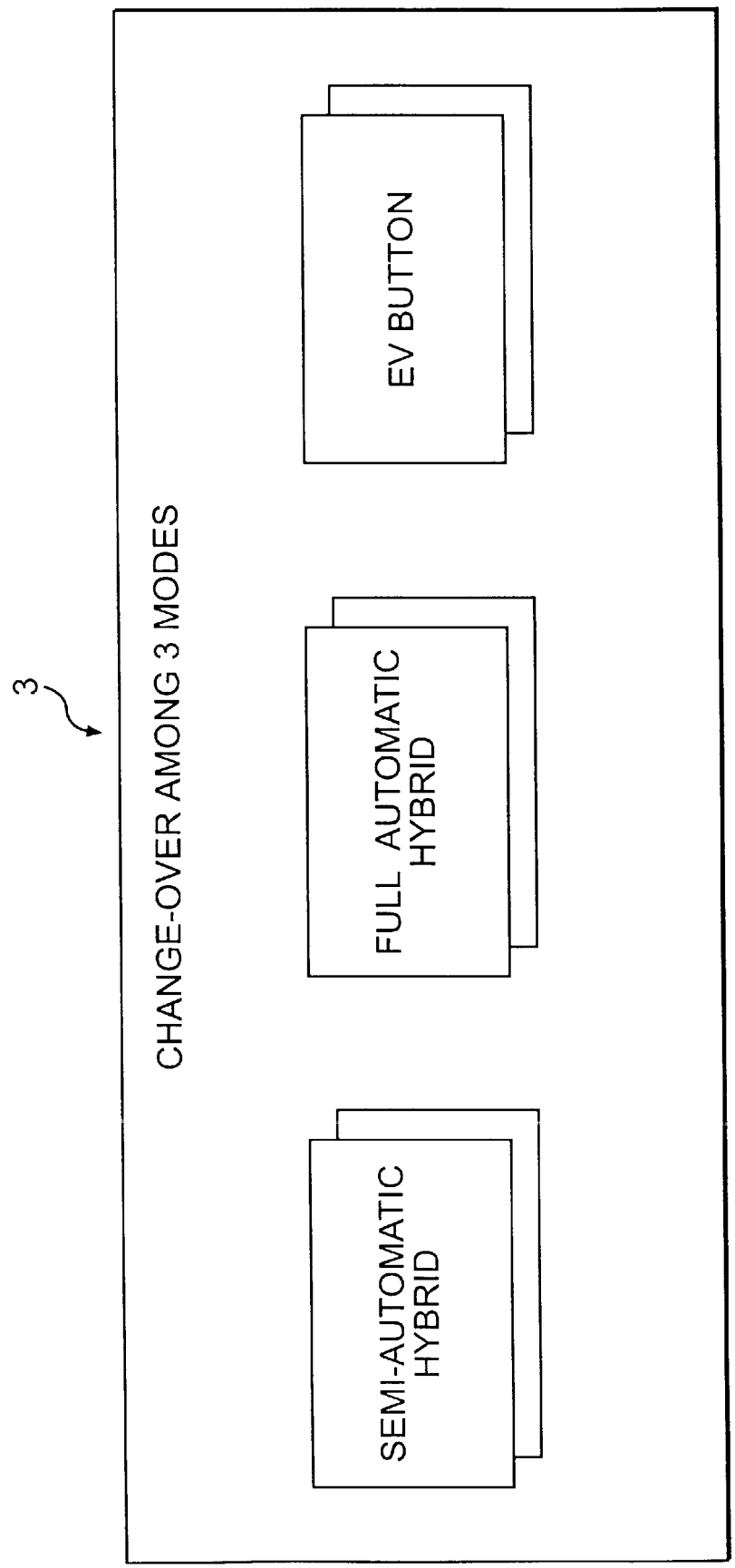
FIG. 12 is a diagram illustrating a mode change-over switch.

FIG. 12 is a diagrammatic view of the mode changeover switch 113. The mode changeover switch 113 changes over the running mode of the hybrid car 100 among the three modes of a semi-automatic mode, a full automatic mode and an EV (running only with the generator-motor 43) mode.

The semi-automatic mode is a mode wherein the driving output power condition of the generator-motor 43 is set higher than that of driving with the engine 61. In this mode, the car runs principally using the generator-motor 43. When the driving torque of the generator-motor 43 is insufficient, it is made up for by driving torque from the engine 61 and therefore, consumption of gasoline is suppressed. Accordingly, while the batteries 21 must be externally charged periodically, the fuel consumption of the engine 61 is better.

Figure 22:
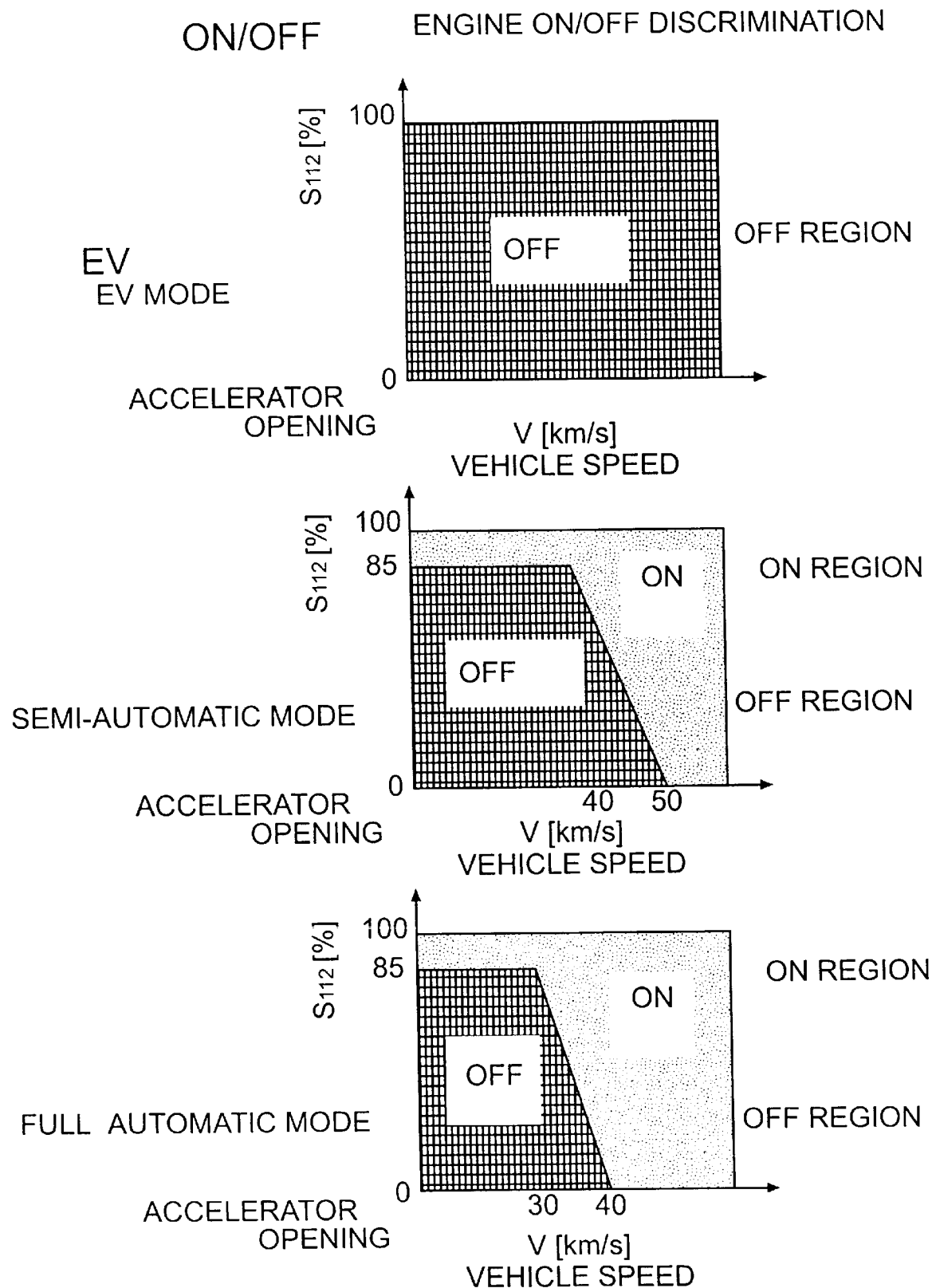
FIG. 22 is a diagram of ON/OFF discrimination of the engine.

The full automatic mode is a running mode wherein the driving output power condition of the engine 61 is set higher than that of driving with the generator-motor 43. In this mode, the car runs principally using the engine 61. When the driving torque by the engine 61 is insufficient, it is made up for by driving torque of the generator-motor 43 and therefore the battery capacity is maintained. Accordingly, the battery batteries 21 need not be externally charged. It is to be noted that an ON/OFF discrimination diagram of the engine is shown in FIG. 22 as a reference for ON/OFF operation of the engine in the three modes of the mode changeover switch 113.

Figure 14:
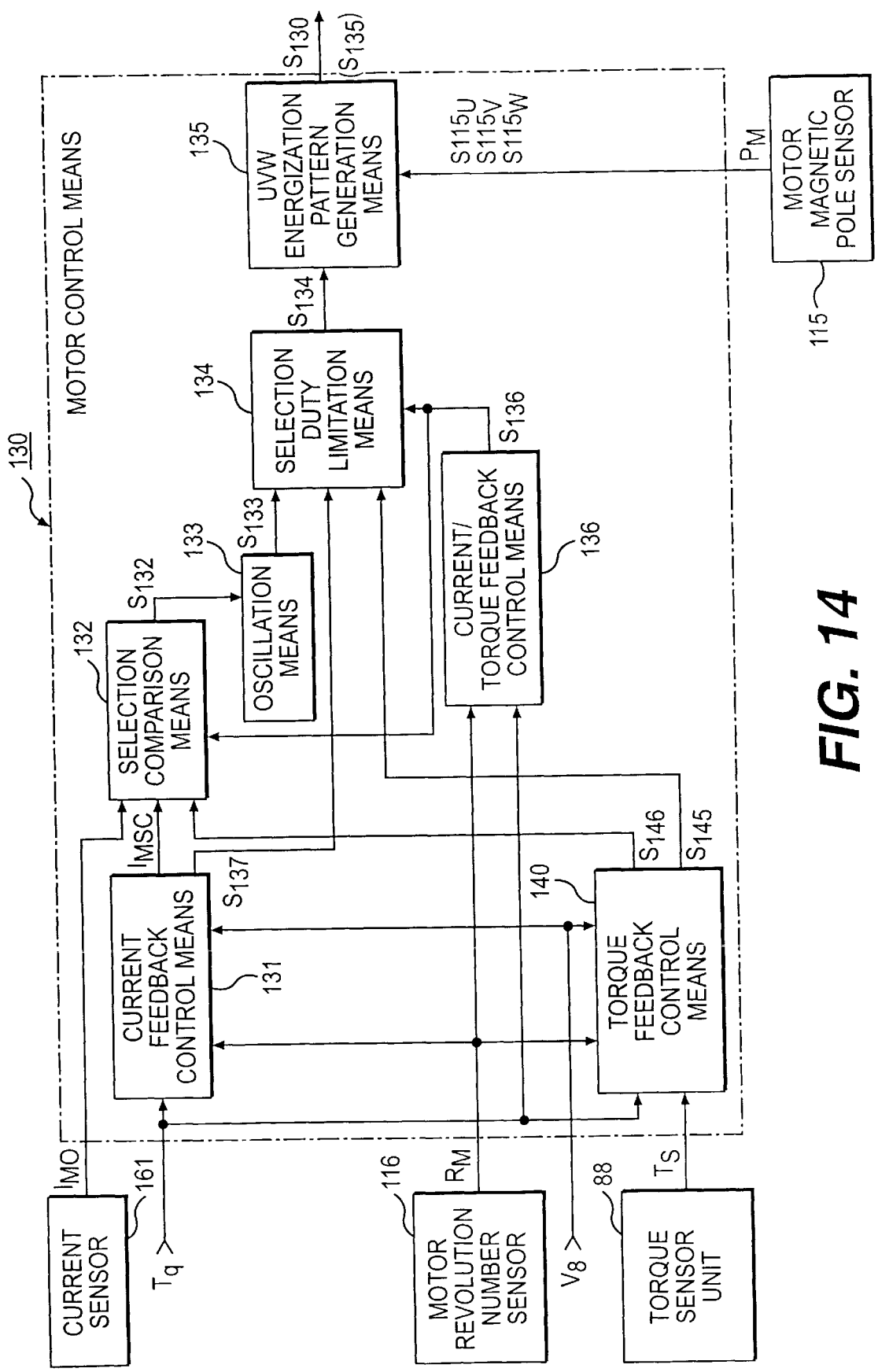
FIG. 14 is a block diagram of a construction of an important part of a form of motor control means of the motor controlling apparatus for the hybrid car.

FIG. 14 is a block diagram of an important part of a form of the motor control means of the motor controlling apparatus for a hybrid car according to the present invention. Referring to FIG. 14, the motor control means 130 includes current feedback control means 131, selection comparison means 132, oscillation means 133, selection duty limitation means 134, UVW energization pattern generation means 135, current/torque feedback control means 136, and torque feedback control means 140.

A motor revolution number sensor 116 outputs a motor revolution number signal $R_M$ obtained by detection of the revolution number of the generator-motor 43 to the current feedback control means 131, the torque feedback control means 140 and the current/torque feedback control means 136. The torque sensor unit 88 outputs a driving wheel torque signal $T_S$, obtained by detecting the torque of the rear wheels 14, to the torque feedback control means 140. It is to be noted that the motor revolution number sensor 116 may serve also as the motor magnetic pole sensor 115 which will be hereinafter described.

The current feedback control means 131 produces a correction aimed current $I_{MSC}$ and a duty limit signal $S_{137}$ based on the torque instruction value $T_q$, the motor revolution number signal $R_M$ and the battery voltage $V_B$. The current feedback control means 131 outputs the correction aimed current $I_{MSC}$ to the selection comparison means 132 and outputs the duty limit signal $S_{137}$ to the selection duty limitation means 134.

The torque feedback control means 140 outputs a duty/lead angle amount limit signal $S_{145}$ and a current limit signal $S_{146}$ based on the driving wheel torque signal TS, the torque instruction value $T_q$, the motor revolution number signal $R_M$ and the battery voltage $V_B$. The torque feedback control means 140 outputs the duty/lead angle amount limit signal $S_{145}$ to the selection duty limitation means 134 and outputs the current limit signal $S_{146}$ to the selection comparison means 132.

The current/torque feedback control means 136 produces a selection signal $S_{136}$ based on the torque instruction value $T_q$ and the motor revolution number signal $R_M$, and outputs the selection signal $S_{136}$ to the selection comparison means 132 and the selection duty limitation means 134.

Figure 26:
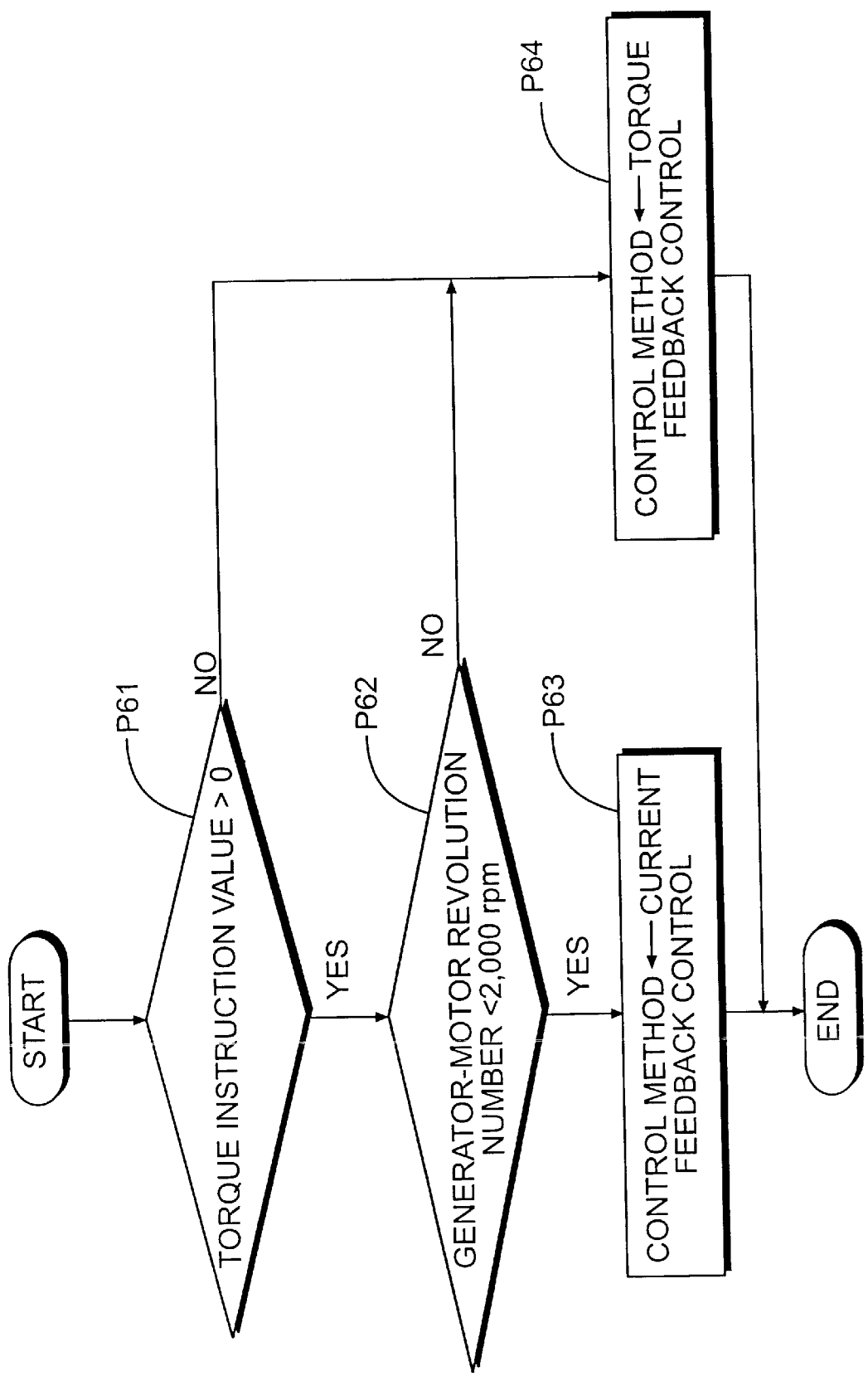
FIG. 26 is a flow chart of an operation of current/torque feedback control means.

FIG. 26 shows an operation flow chart of the current/torque feedback control means.

In step P61, it is discriminated whether or not the toque instruction value $T_q$ is higher than 0 ($T_q$>0), and if the discrimination is YES, then the control advances to step P62, but if the discrimination is NO, then the control advances to step P4.

In step P62, it is discriminated whether or not the motor revolution number signal $R_M$ is lower than 2,000 rpm $R_M$<2,000 rpm). If the discrimination is YES, then the control advances to step P63. If the discrimination is NO, then the control advances to step P64. In step P63, the selection signal $S_{136}$ for setting the controlling method for the motor control means 130 to current feedback control is outputted. In step P64, the selection signal $S_{136}$ for setting the controlling method for the motor control means 130 to torque feedback control is outputted.

Figure 16:
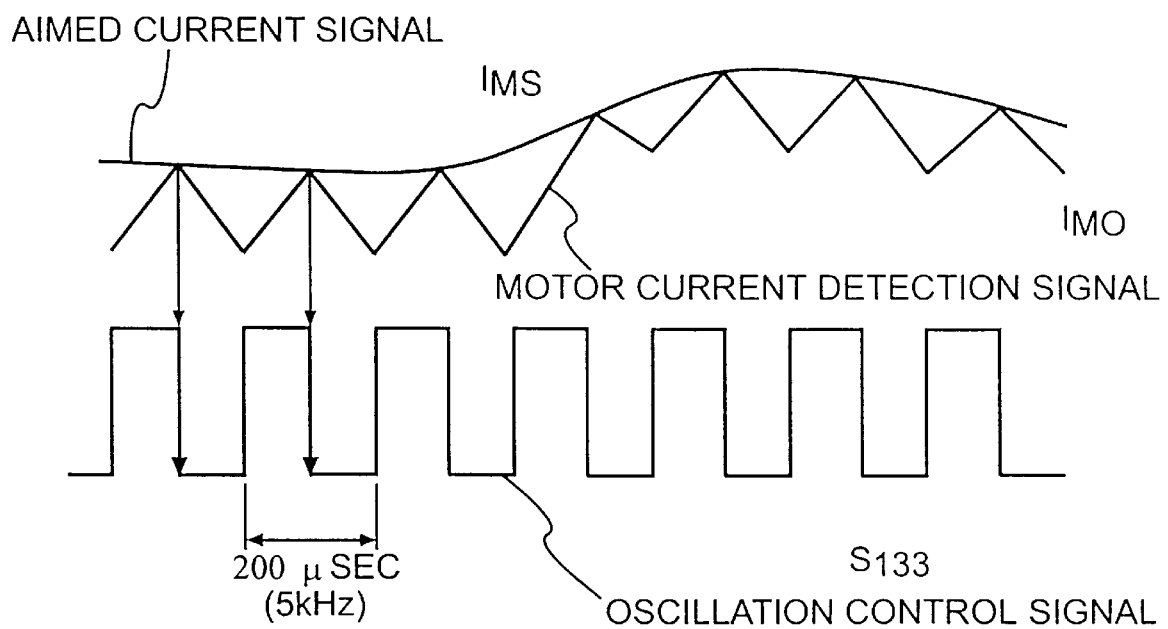
FIG. 16 is a diagram illustrating a relationship among an aimed current signal, a motor current detection signal and an oscillation control signal.

Referring back to FIG. 14, the selection comparison means 132 selects one of the correction aimed current $I_{MSC}$ and the current limit signal $S_{146}$ based on the selection signal $S_{136}$. The selection comparison means 132 compares the selected signal and a motor current detection signal $I_{MO}$ in magnitude. When the motor current detection signal $I_{MO}$ is equal to or higher than the selected signal ($I_{MO} \geq I_{MS}$ or $S_{146}$), a reset signal $S_{132}$ is sent to the oscillation means 133 (refer to FIG. 16).

The oscillation means 133 oscillates pulses of, for example, 5 KHz and outputs an oscillation control signal $S_{133}$ (refer to FIG. 16) obtained by resetting the pulse oscillation output by the reset signal $S_{132}$ to zero to control the duty to the selection duty limitation means 134. The selection duty limitation means 134 outputs a duty limit control signal $S_{134}$ to the UVW energization pattern generation means 135. The duty limit control signal $S_{134}$ is obtained by limiting the duty of the oscillation control signal $S_{133}$ (refer to FIG. 16) with one of the duty limit signal $S_{137}$ and the duty/ lead angle amount limit signal $S_{145}$, selected based on the selection signal $S_{136}$.

The motor magnetic pole sensor 115 generates three kinds of timing signals at intervals of 120 degrees in conformity with the U phase, the V phase and the W phase of the motor coils. The motor magnetic pole sensor 115 outputs a magnetic pole position signal $P_M$ ($S_{115U}$, $S_{115V}$, $S_{115W}$), obtained by detecting the positions of the magnetic poles of the generator-motor 43 as shown in FIG. 20, to the UVW energization pattern generation means 135.

The UVW energization pattern generation means 135 outputs a driving control signal $S_{130}$, obtained by producing energization patterns of the U, V and W phases of the three-phase DC brushless generator-motor 43 based on the duty limit control signal $S_{134}$ and the magnetic pole position signal $P_M$, to the driving means 151.

Figure 27:
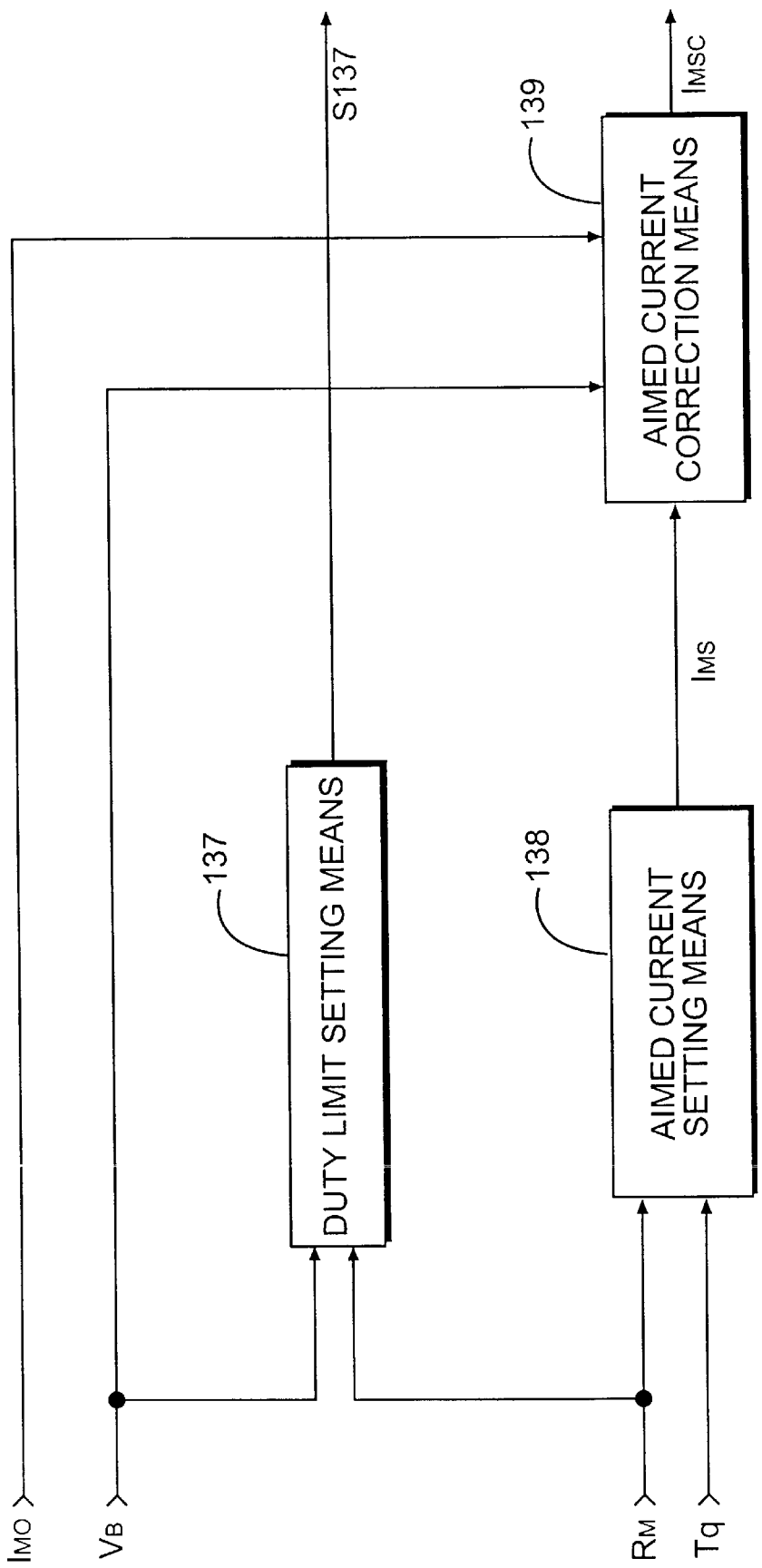
FIG. 27 is a block diagram of a construction of an important part of a form of current feedback control means.

FIG. 27 is a block diagram of an important part of a form of the current feedback control means according to the present invention. Referring to FIG. 27, the current feedback control means 131 includes duty limit setting means 137, aimed current setting means 138 and aimed current correction means 139. The duty limit setting means 137 output a duty limit signal $S_{137}$ for limiting the duty of the oscillation control signal $S_{133}$, based on the battery voltage $V_B$ and the motor revolution number signal $R_M$, to the selection duty limitation means 134.

The aimed current setting means 138 is formed from a memory, such as a ROM, and stores aimed current data corresponding to the torque instruction valve $T_q$ and the motor revolution number signal $R_M$. The aimed current setting means 138 outputs an aimed current signal $I_{MS}$ obtained by reading out the aimed current data using the torque instruction value $T_q$ and the motor revolution number signal RM as an address, to the aimed current correction means 139. The aimed current correction means 139 outputs a correction aimed current $I_{MSC}$, obtained by correction processing of the aimed current signal $I_{MS}$ based on the motor current detection signal $I_{MO}$ and the toque instruction value $T_q$, to the selection comparison means 132.

Figure 28:
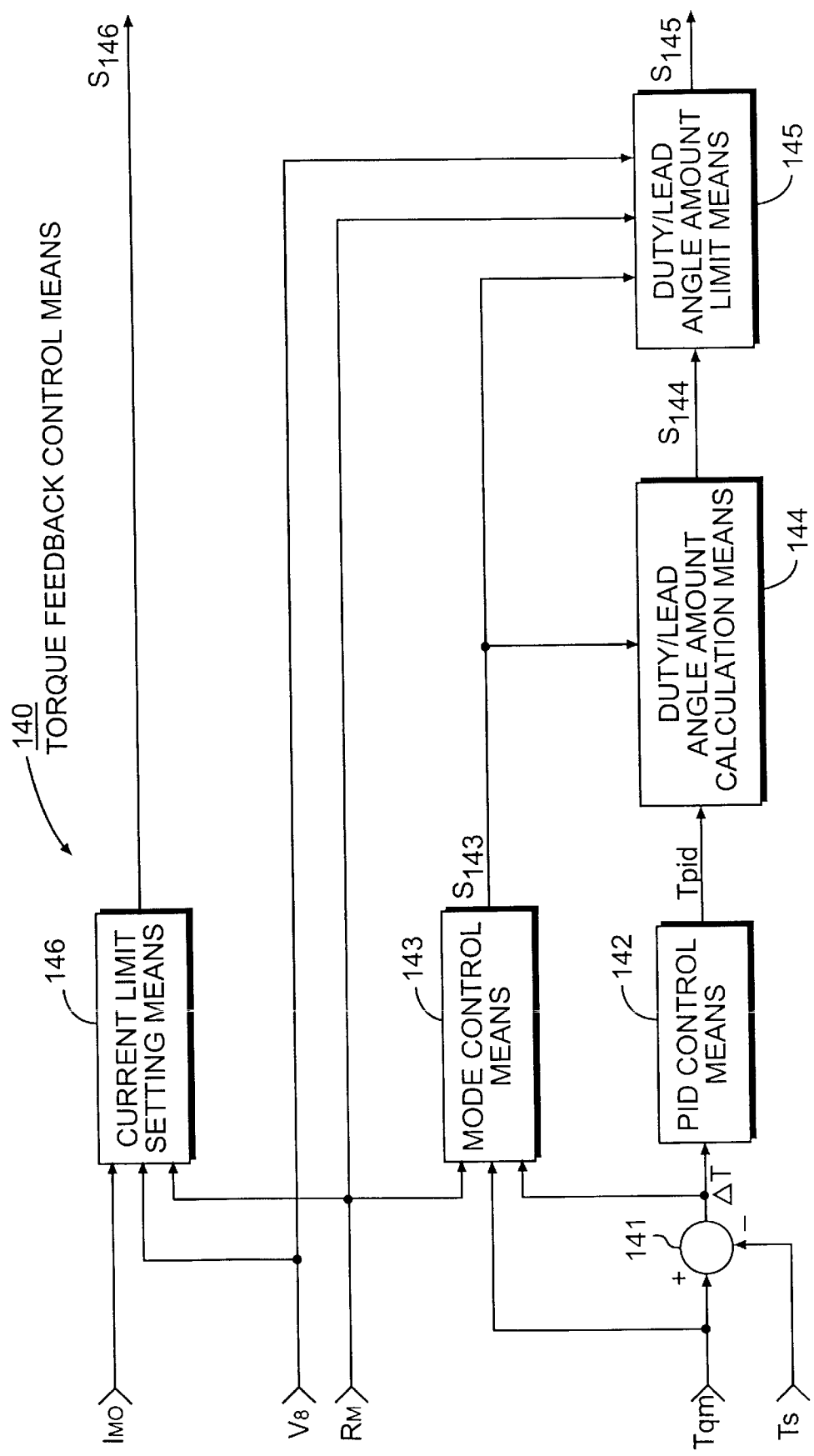
FIG. 28 is a block diagram of a construction of an important part of a form of torque feedback control means.

FIG. 28 is a block diagram of an important part of a form of the torque feedback control means according to the present invention. Referring to FIG. 28, the torque feedback control means 140 includes current limit setting means 146, mode control means 143, deviation calculation means 141, PID (proportional plus integral plus derivative) control means 142, duty/lead angle amount calculation means 144, and -duty/lead angle amount limit means 145.

The current limit setting means 146 is formed from a memory, such as a ROM. The ROM stores current limit data corresponding to the motor current detection signal $I_{MO}$, the battery voltage $V_B$ and the motor revolution number signal $R_M$. The current limit setting means 146 outputs a current limit signal $S_{146}$, obtained by reading out; the current limit data using the motor current detection signal $I_{MO}$, the battery voltage $V_B$ and the motor revolution number signal $R_M$ as an address, to the selection comparison means 132.

The PID control means 142 is composed of a proportional element, an integral element, a derivative element and addition means not shown. The proportional element performs P (proportional control) for a deviation signal ΔT. The integral element performs I (integral control) for the deviation signal ΔT. The derivative element performs D (derivative control) for the deviation signal ΔT. The addition means outputs a PID control signal $T_{pid}$ obtained by adding outputs of the elements to the duty/lead angle amount calculation means 144.

The mode control means 143 produces a mode control signal $S_{143}$ for controlling the torque feedback control means 140 to a duty control mode or a lead angle amount control mode, based on the motor revolution number signal $R_M$, the torque instruction value $T_q$ and the deviation signal ΔT. The mode control means 143 outputs the mode control signal $S_{143}$ to the duty/ lead angle amount calculation means 144 and the duty/lead angle amount limit means 145.

The duty/lead angle amount calculation means 144 outputs a duty/lead angle amount signal $S_{144}$, obtained by calculation of a duty or a lead angle amount based on the PID control signal $T_{pid}$ and the mode control signal $S_{143}$, to the duty/lead angle amount limit means 145. The duty/lead angle amount limit means 145 outputs a duty/lead angle amount limit signal $S_{145}$, obtained by limiting the duty/lead angle amount signal $S_{144}$ based on the battery voltage $V_B$, the motor revolution number signal RM and the mode control signal $S_{143}$, to the selection duty limitation means 134.

Figure 17:
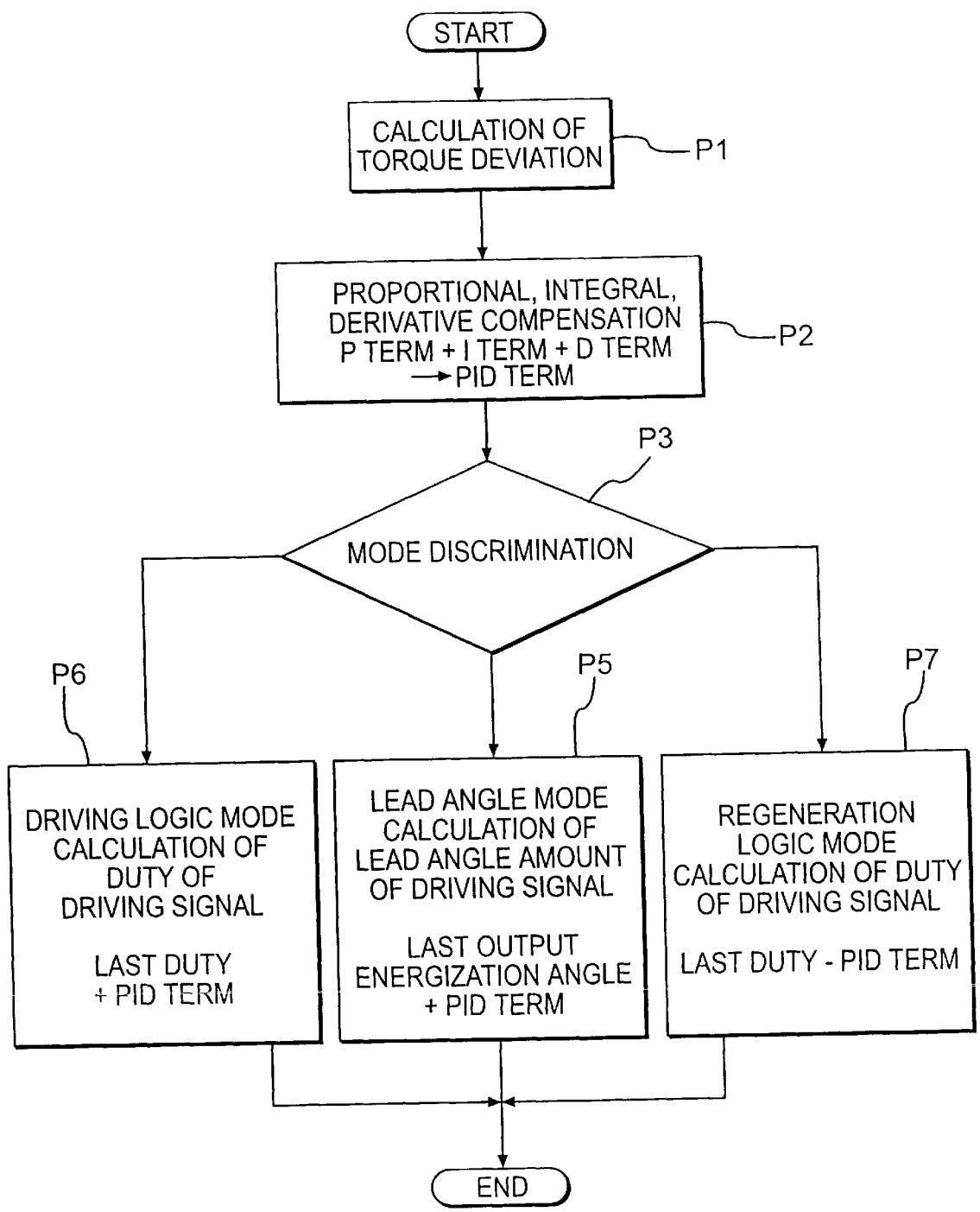
FIG. 17 is a flow chart of an operation of torque feedback control means and mode control means.

FIG. 17 is an operation flow chart of the torque feedback control means and the mode control means. In step P1, a torque deviation calculation (ΔT=$T_q$-$T_s$), to be performed by the deviation calculation means 141 is performed to calculate a deviation signal ΔT. Then, the control advances to step P2. In step P2, PID compensation is performed for the deviation signal ΔT by the PID control means 142, "hereafter the control advances to step P3. In step P3, mode discrimination, which will be hereinafter described with reference to FIG. 18, is performed, and the control advances to one of steps P5 to P7 in accordance with the discrimination.

In step P5, the duty/lead angle amount calculation means 144 enters a lead angle mode, in which it performs calculation of the lead angle amount. In step P6, the duty/lead angle amount calculation means 144 enters a driving logic mode, in which it performs calculation of the duty. In step P7, the duty/lead angle amount calculation means 144 enters a regeneration logic mode, in which it performs calculation of the duty.

Figure 18:
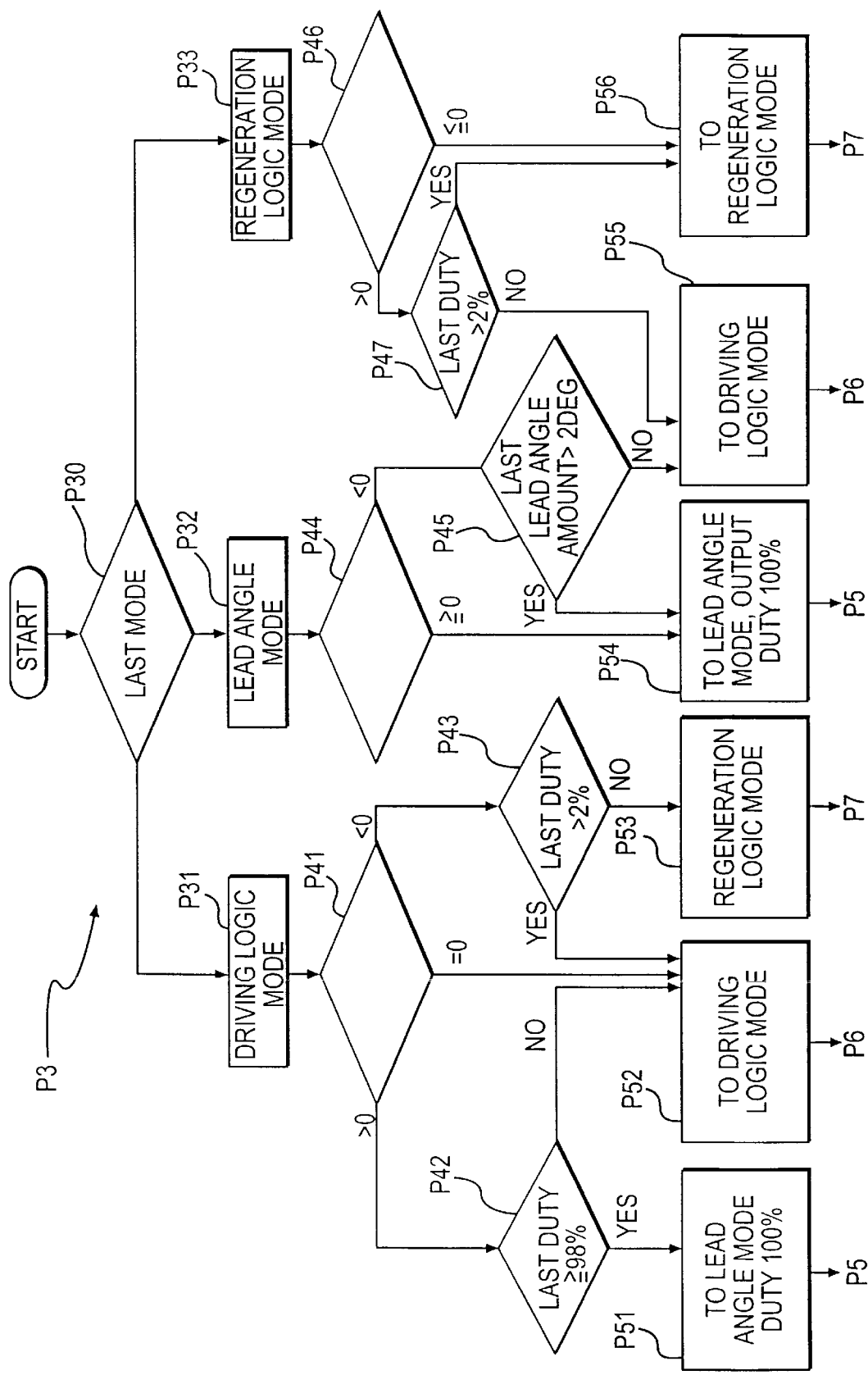
FIG. 18 is a flow chart of discrimination among a driving logic mode, a lead angle mode and a regeneration logic mode.

Here, the discrimination flow of FIG. 18 is described with reference to FIGS. 15, 17 and 20. The lead angle mode is control wherein, as indicated by a broken line in output waveforms of FIG. 20 (the driving signal $S_{UF}$ is taken as an example), the signals of $S_U$, $S_V$ and $S_W$ which make driving signals are turned on (led) rather early with respect to the signals $S_{115U}$, $S_{115V}$ and $S_{115W}$ of the motor magnetic pole sensor 115. This can change the characteristic of the motor to that of a low torque high rotation type, and particularly can increase the torque upon high rotation. This rotates the motor at a high speed by decreasing the fields of the motor coils, and is called field-weakening control. The lead angle is proceeded while the normal energization angle of 120° is continuously increased, and after the energization angle is increased to 170°, the lead angle is further increased while the energization angle is held at 170°.

In the flow chart illustrated in FIG. 18 in the first step P30, the preceding control mode is discriminated as to which one of the driving logic modes, the lead angle mode and the regeneration logic mode. Then, for the discriminated driving logic mode (step P31), lead angle mode (step P32) or regeneration logic mode (step P33), discrimination of whether a deviation ΔT (=$T_q$-$T_s$) between the aimed torque ($T_q$) and the current torque ($T_s$) is positive (+), zero (0) or negative (−) is executed (steps P41, P44 and P46).

If it is discriminated in step P41 that the deviation ΔT is positive (ΔT>0), then since the current torque ($T_s$) is insufficient with respect to the aimed torque ($T_q$), the control advances to step P42. In step P42, the duty (Duty) in the last energization to the motor is equal to or higher than 98%. If the last duty is equal to or higher than 98%, then the control advances to step P51. In step P51, the lead angle mode is entered and the duty is set to 100%. Accordingly, field-weakening control is started at this point of-time. In the lead angle mode, an energization angle wherein PID (proportional, integral and derivative) terms are added to the last energization angle is determined (step P5 of FIG. 17), and an angle by which the determine-denergization angle exceeds the ordinary energization angle (120°) is led as indicated by a broken line in FIG. 20.

Conversely, when the last duty in step P42 is lower than 98%, and when it is discriminated in step P41 that the deviation $\Delta T$ is zero ($\Delta T=0$), the control advances to step P52, in which the driving logic mode is entered, and a duty obtained by adding PID (proportional, integral and derivative) terms to the last energization duty is outputted as a driving signal (step P6 shown in FIG. 17).

When it is discriminated in step P41 that the deviation $\Delta T$ is negative ($\Delta T<0$), the control advances to step P43, in which discrimination of whether or not the last duty exceeds 2% is executed. If the last duty exceeds 2%, then the control advances to step P52, in which the driving logic mode is entered, but if the last duty is equal to or lower than 2%, then the control advances to step P53, in which the regeneration logic mode is entered. If the deviation $\Delta T$ is negative ($\Delta T<0$), then since also the PID terms become positive→0→negative. Although the PID terms are added (step P6 illustrated in FIG. 17) in the driving logic mode (step P52), the energization duty continues to decrease within the period within which the deviation $\Delta T$ is negative ($\Delta T<0$).

As the duty decreases, also the current torque ($T_s$) decreases, and if the aimed torque ($T_q$) is positive, then when the current torque (Ts) and the aimed torque ($T_q$) become equal to each other ($T_q=T_s$), the deviation $\Delta T$ becomes $\Delta T=0$, and also the PID terms become 0. The duty becomes stable with the value at the present point of time, and fixed torque operation is entered.

If the aimed torque ($T_q$) is negative ($T_q<0$), for example when the vehicle is decelerating, since the deviation $\Delta T$ remains negative by whichever amount the energization duty decreases. At a point in time when the energization becomes equal to or lower than 2%, the mode of the motor changes from the driving logic mode to the regeneration logic mode (step S53), and the motor enters a regeneration braking condition to generate a deceleration feeling. At this point of time, a regeneration mode is started.

The regeneration logic mode is a mode wherein, as illustrated in FIG. 20, the coils of the U phase, the V phase and the W phase and the batteries are put into an on-state by the FETs $Q_1$, $Q_3$ and $Q_5$, so that the coils may have connection timings for each 120 degrees. In the regeneration logic mode, the PID terms are subtracted from the last duty to calculate a motor duty (step P7 of FIG, 17). While the deviation AT is equal to or lower than 0 ($\Delta T \leq 0$) (from step 46 to step P56), also the PID terms are equal to or lower than 0, and the energization duty of the motor is substantially increased from a minimum value equal to or lower than 2% and regeneration braking increases.

Consequently, since the value of the current torque ($T_s$) becomes negative ($T_s<0$) by the regeneration braking, both of the aimed torque ($T_q$) and the torque ($T_s$) become negative values, and the deviation $\Delta T$ gradually approaches 0 from the negative value. Thereafter, at the point in time when the deviation $\Delta T$ becomes positive ($\Delta T>0$) (step P46), the regeneration logic mode is continued before the last duty becomes lower than 2% (step P56). This occurs because the PID terms become positive as the deviation $\Delta T$ becomes positive, the duty decreases. Then, at the point of time when the duty becomes lower than 2%, the driving logic mode is entered (the control advances from step P55 to step 6 of FIG. 17). Accordingly, the regeneration logic mode comes to an end at this point in time.

If the deviation $\Delta T$ is positive, then since also the PID terms are positive, the duty is now increased by the calculation in step P6 illustrated in FIG. 17. Then, in step P44, if the deviation $\Delta T$ is equal to or higher than 0 ($\Delta T \geq 0$), since the last mode is the lead angle mode, an increase of the torque is demanded continuously, and the lead angle mode is continued through step P54 (step P5 of FIG. 17 ).

Conversely, if the deviation $\Delta T$ is negative ($\Delta T<0$) in step P44, then the lead angle mode is continued until the last lead angle amount becomes equal to or smaller than 2 degrees ($\leq 2$ deg.) (from step P45 to step P5 of FIG. 17). In this instance, in step P5, the PID terms are added to the last energization angle. However, since the deviation $\Delta T$ is negative ($\Delta T<0$), the PID terms themselves change to negative values. Consequently, at a point in time when the lead angle amount becomes equal to or smaller than 2 degrees, the driving logic mode is entered (step P6 of FIG. 17 ). Accordingly, the field-weakening control is ended at this point in time.

Figure 29:
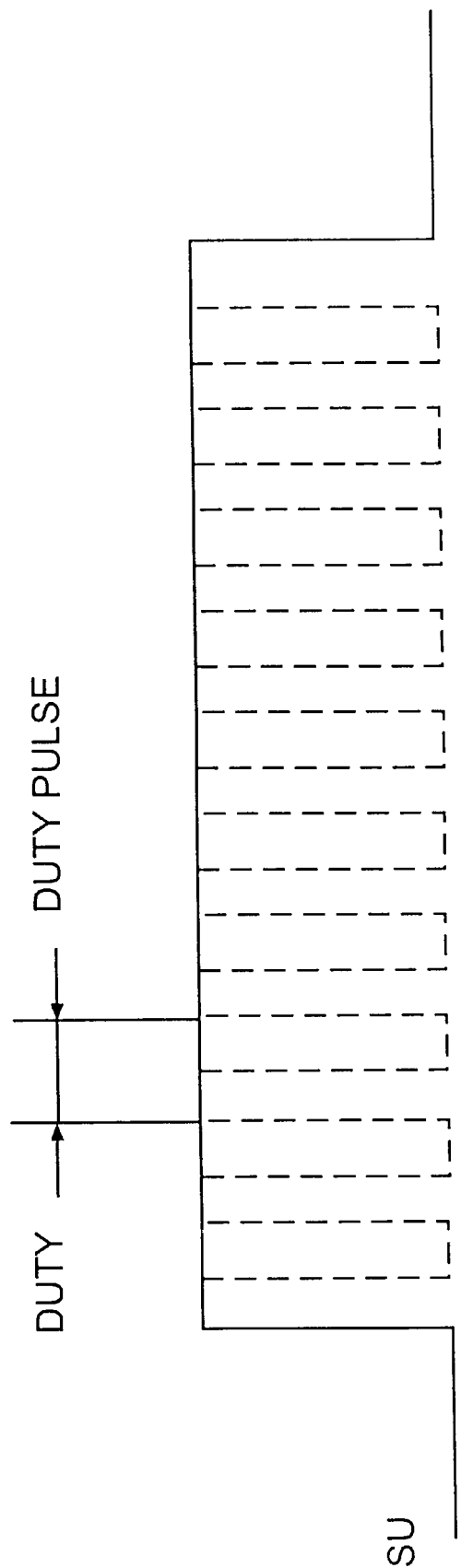
FIG. 29 is a waveform diagram of a duty pulse.

By switchably controlling the mode among the driving logic mode, the lead angle mode and the regeneration logic mode in response to the value of the deviation $\Delta T$ to effect control, torque feedback control confirming to a desired aimed torque ($T_q$) can be performed. It should also be noted that while the driving signals ($S_U$, $S_V$ and $S_W$) of FIG. 20 are on (in the H level state) in all of the modes, a delicate duty pulse is outputted as shown in FIG. 29 so that the effective voltage of the motor is controlled.

Figure 19:
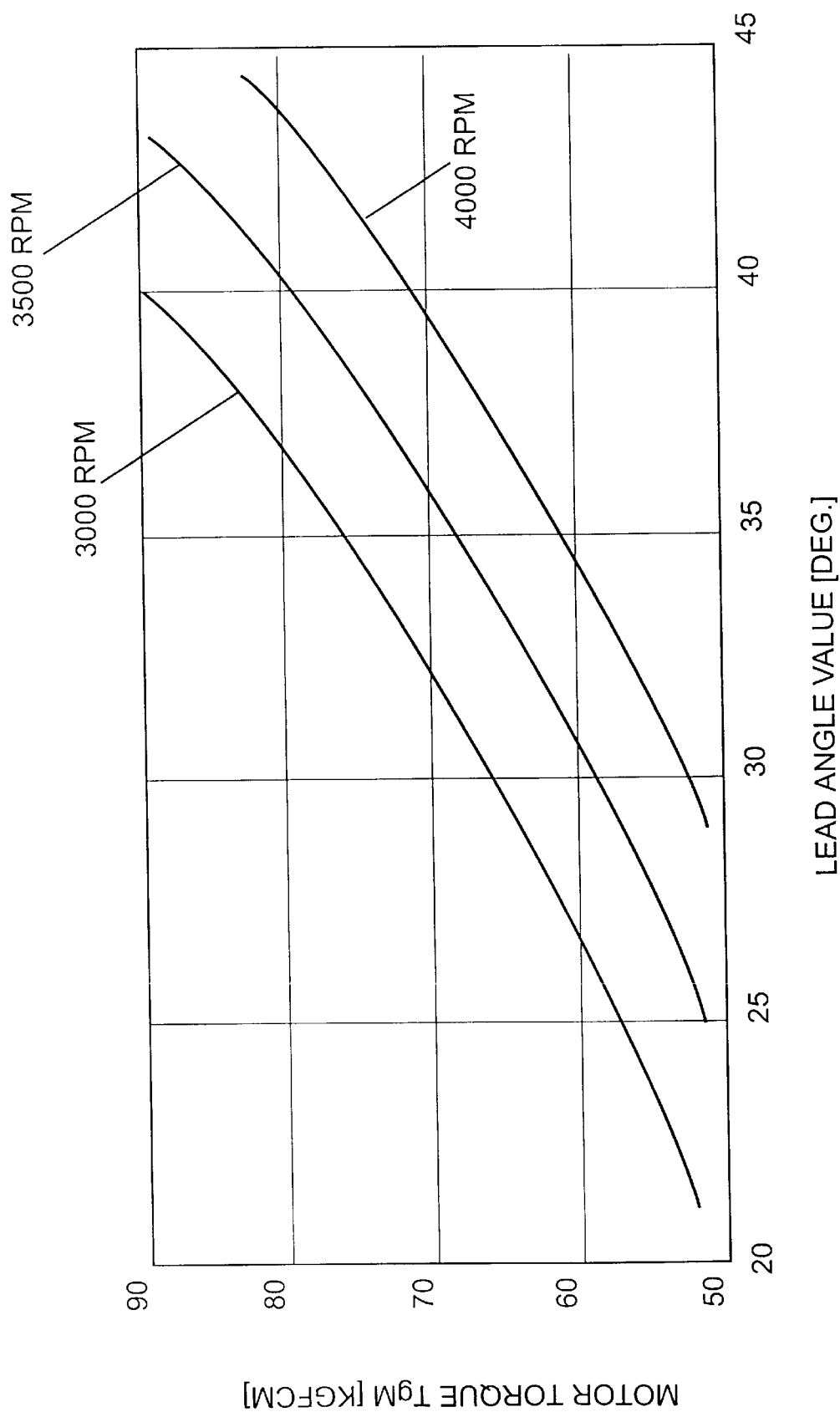
FIG. 19 illustrates a motor torque characteristic with respect to a lead angle value of the motor.

FIG. 15 shows a circuit of the driving means. Referring to FIG. 15, the driving means 151 includes N-channel FETs ($Q_1$ to $Q_6$), flywheel diodes (D1 to D6), and a capacitor C1. The driving means 151 receives an on/off signal of the driving control signal $S_{130}$ at the gates (G2, G4 and G6) and a PWM signal of the driving control signal $S_{130}$ at the gates (G1, G3 and G5). The driving means 151 outputs such driving signals ($S_U$, $S_V$ and $S_W$, or $S_{UF}$, $S_{VF}$ and $S_{WF}$, or else $S_{UB}$, $S_{VB}$ and $S_{WB}$) as shown in FIG. 19 to the three-phase DC brushless generator-motor 43 to control driving of the generator-motor 43.

The hybrid car 100 also includes the rear wheels 14, the generator-motor 43, the transmission 48, the engine 61, the various sensors 110, the batteries 21, the hybrid car motor control apparatus 150, the driving means 151, driving/regeneration changeover means 152 and the throttle control actuator 155. The hybrid car 100 discriminates a full automatic mode wherein the engine is driven only within a range within which the fuel consumption efficiency is high and generation energy, obtained by driving the generator-motor with the engine output power, is used to charge the batteries while the car is running. The hybrid car 100 also discriminates a semi-automatic mode wherein the generator-motor is driven with supply power from the batteries to cause the car to run and, only when the driving force of the generator-motor is insufficient, the engine driving force is assisted, by a switching operation of the mode switch to control driving of the engine and the generator-motor so that running principally with the engine or running principally with the EV (generator-motor) can be performed, when rotation of the generator-motor is low, current feedback control by which the motor current can be controlled with a high degree of accuracy whereas it performs torque feedback control in a high vehicle speed-high torque region, and controls the allowable maximum motor current value to protect the generator-motor from excessive current and can raise the fuel consumption efficiency of the engine. Consequently, also it is possible to reduce to current sensors 161 to one, and reduction in cost is possible.

Figure 13:
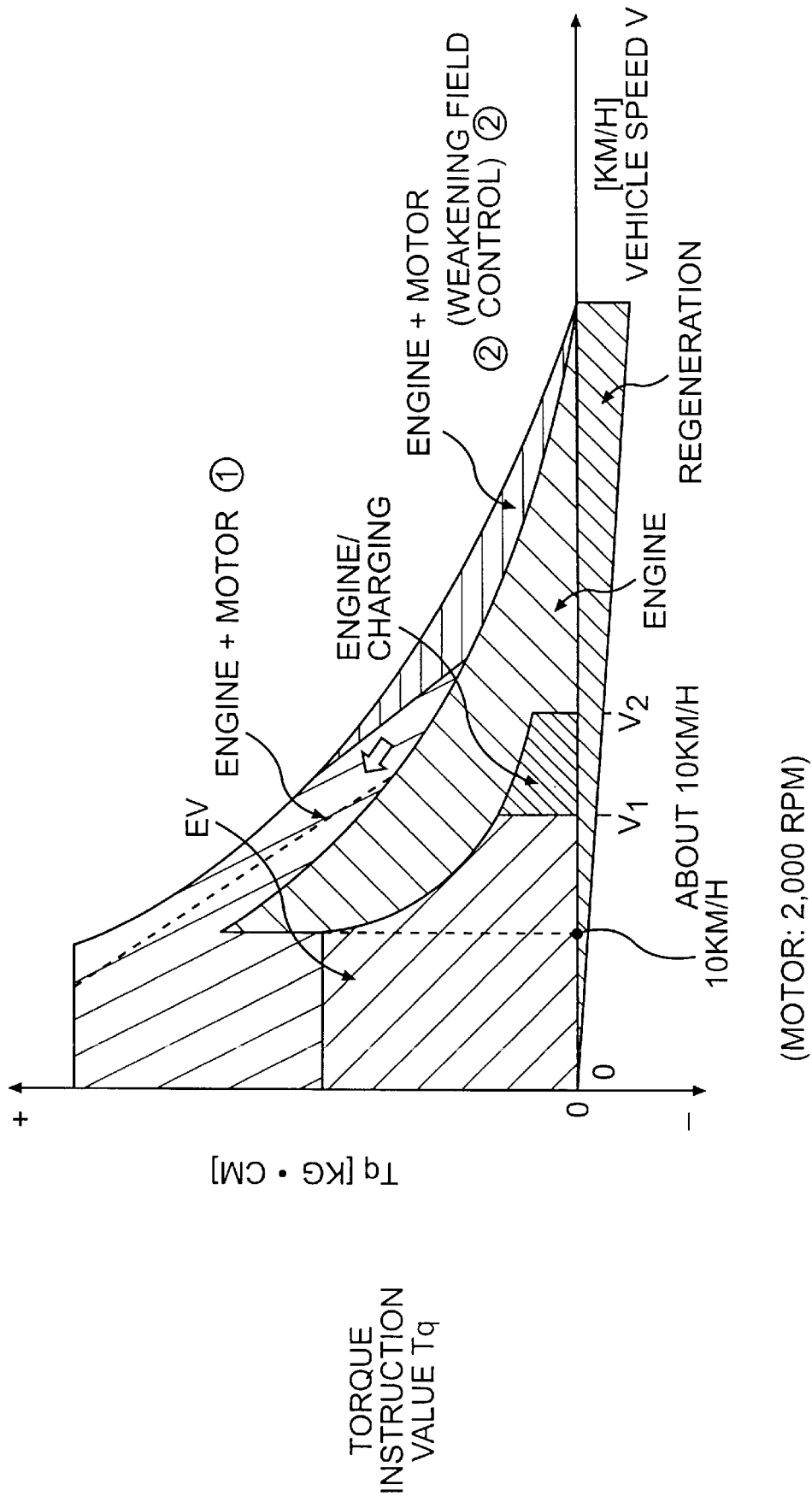
FIG. 13 is a diagram illustrating driving regions of an engine and a motor in the hybrid car.

FIG. 13 is a diagram illustrating the driving regions of the engine and the motor of the hybrid car according to the present invention. The hybrid car 100 basically allows driving with the engine 61 over the entire driving region. Referring to FIG. 13, the axis of abscissa is the vehicle speed V (km/h) and the axis of ordinate is the torque instruction value $T_q$ (kgf•cm), and the driving region is divided into an engine region in which the engine 61 drives the car, an EV region in which the car is driven only with the generator-motor 43, an engine charging region in which the engine 61 is operated in a high efficiency region to drive the generator-motor 43 and generation energy generated by the generator-motor 43 is used to charge the batteries 21 while the car is running, a charging region and a regeneration region in which, when the car is decelerated, regeneration braking is applied by the generator-motor 43 to cause the generator-motor 43 to generate power to charge the batteries 21, an engine/motor region ① in which the car is driven with the engine 61 and the generator-motor 43, and another engine/motor region ② in which the car is driven with the engine 61 and the generator-motor 43 which is controlled by field-weakening control.

Figure 23:
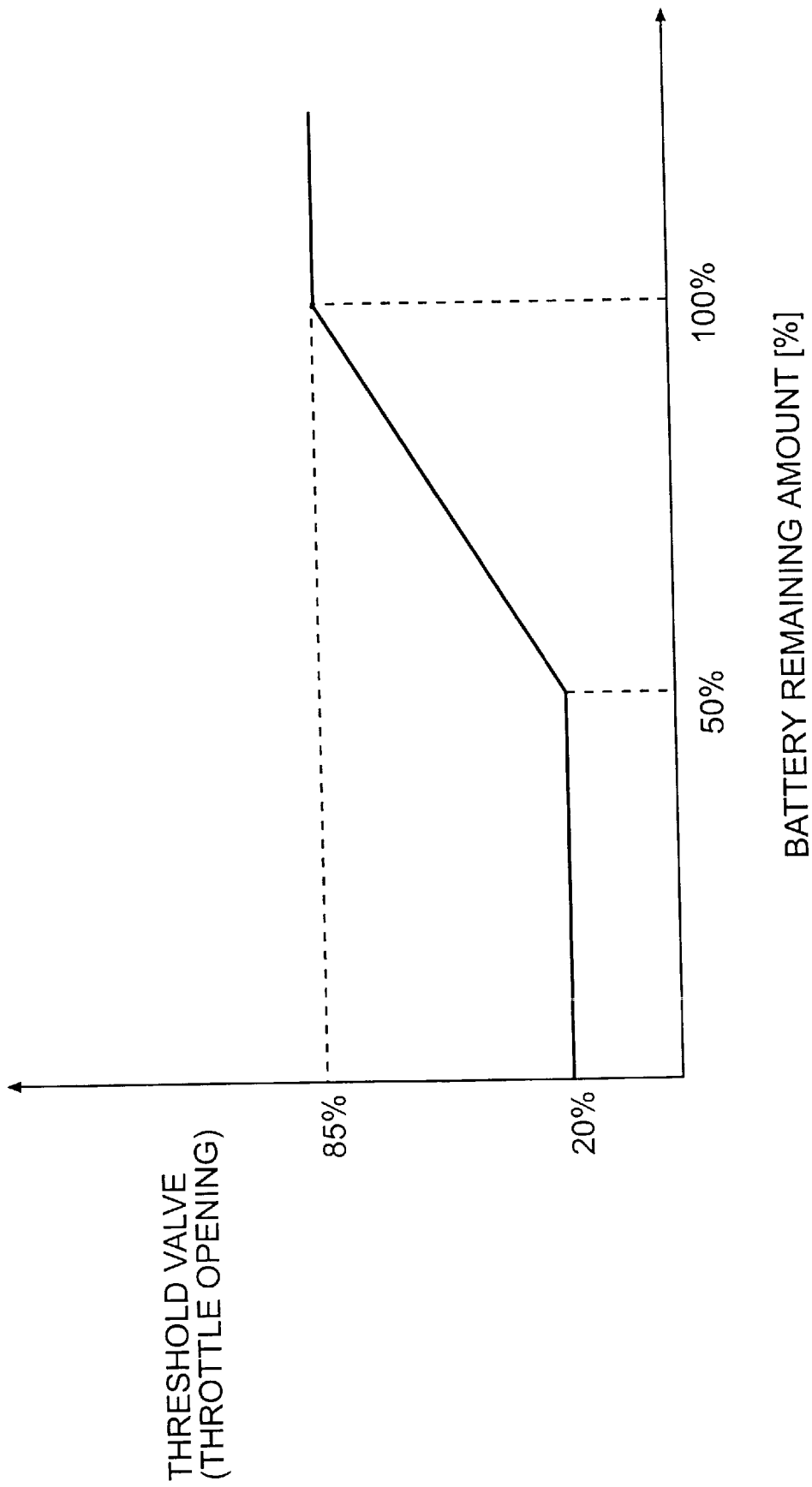
FIG. 23 is a characteristic diagram of a battery remaining amount and a throttle opening (accelerator opening) threshold value.
Figure 24:
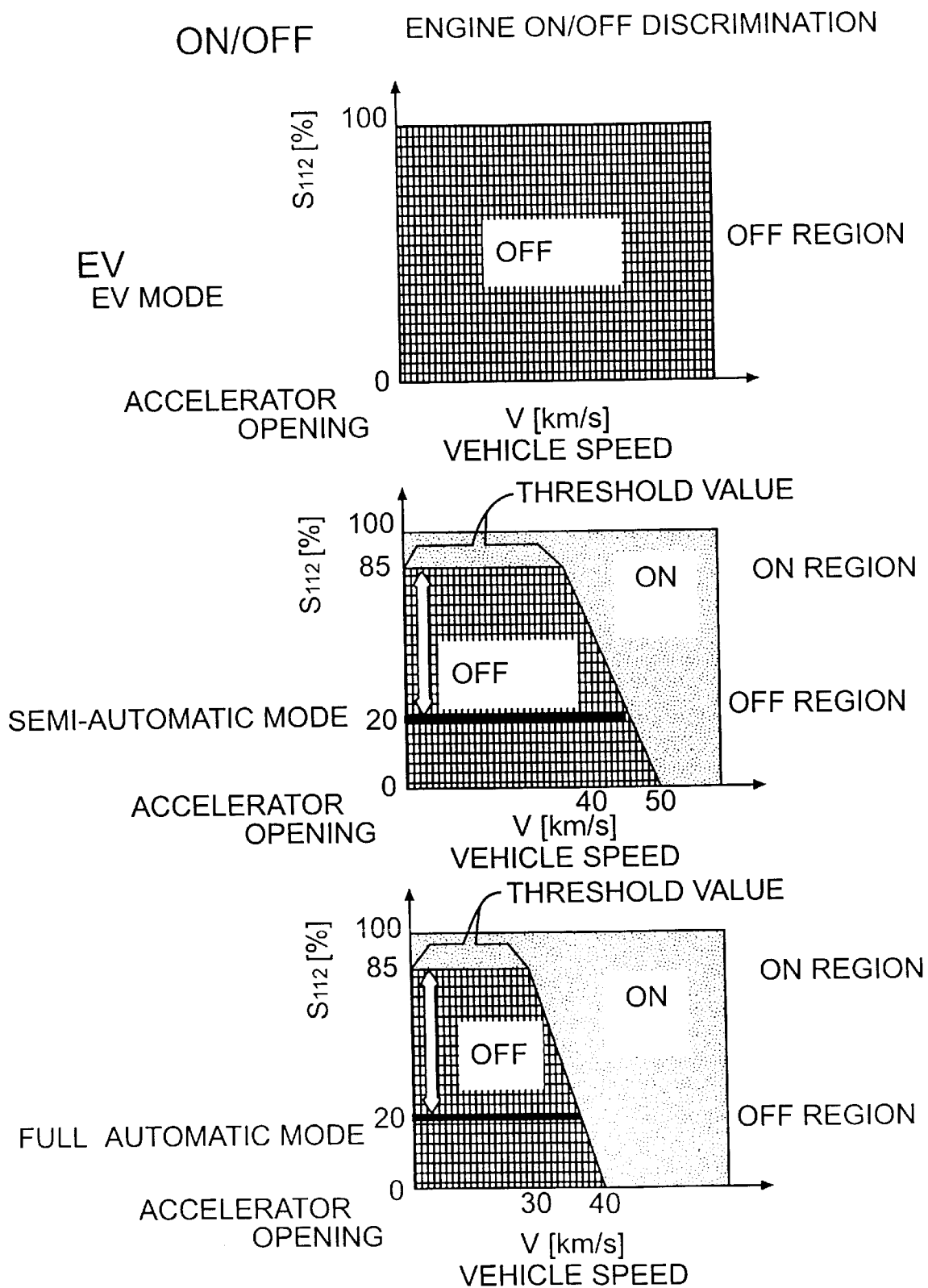
FIG. 24 is a diagram of ON/OFF discrimination of the engine.

It is to be noted that the boundary between the engine/motor ① region and the engine/motor region ② is corrected such that, as the voltage of the batteries 21 drops, the boundary between the engine/motor regions ① and ② moves as indicated by an arrow mark to a region of a broken line which is wider. It is to be noted that such a construction that the relationship between the battery remaining amount and the threshold value for the throttle opening (accelerator opening) is determined in such a manner as illustrated in FIG. 23 and ON/OFF discrimination of the engine is performed as shown in FIG. 24 may be employed. The relationship may be stored as a data table in a ROM in the control apparatus so that it may be referred to at any time.

Where the battery remaining amount is, for example, 0 to 50%, the threshold value is set, for example, to 20%. Where the battery remaining amount is, for example, higher than 100%, the threshold value is set, for example, to 85%. Where the battery remaining amount is, for example, 50 to 100%, the threshold value exhibits a gradual increase.

Figure 25:
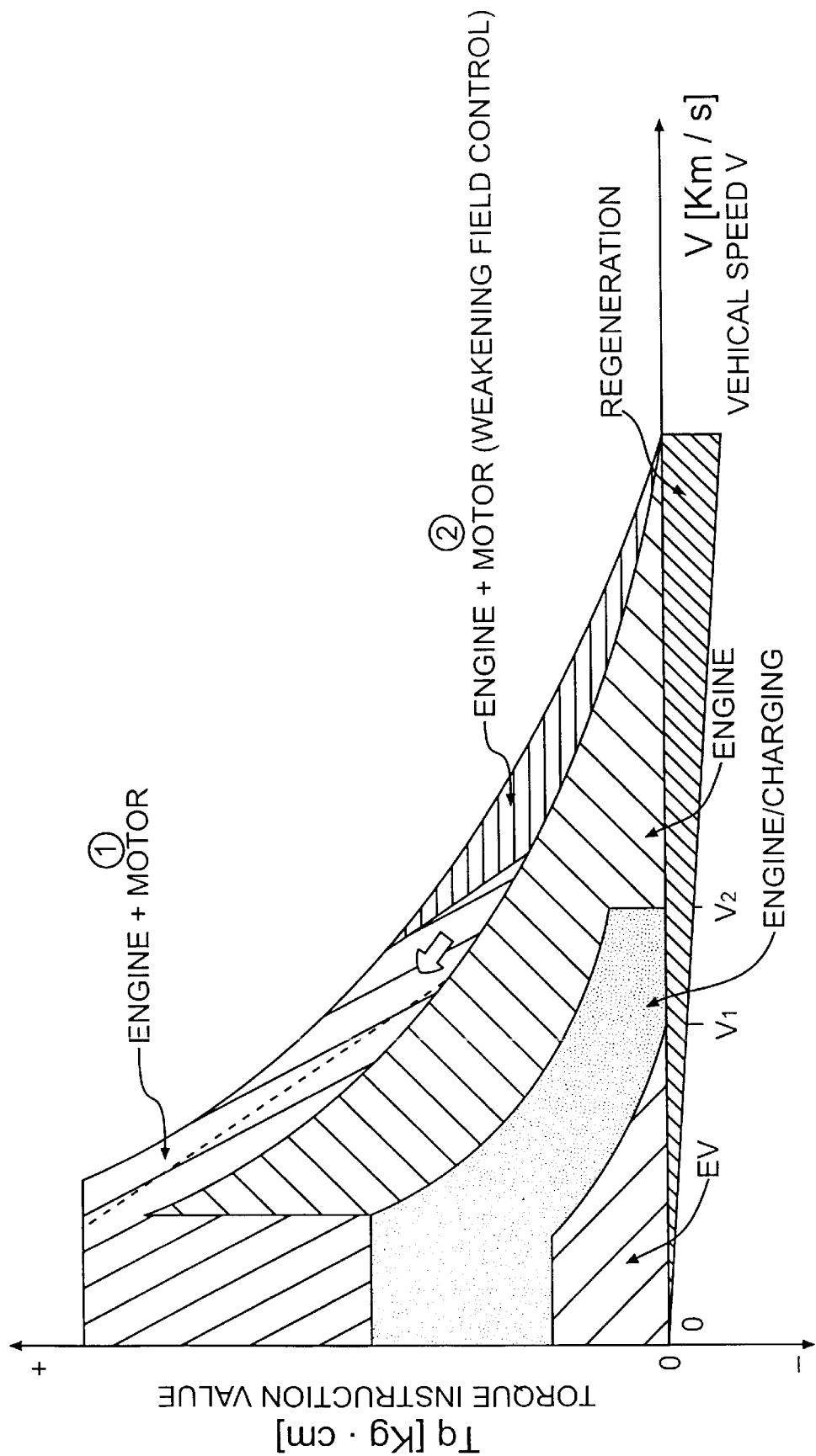
FIG. 25 is another diagram illustrating driving regions of the engine and the motor of the hybrid car.

In the semi-automatic mode and the full automatic mode of FIG. 24, the threshold value for accelerator opening at which operation of the engine is started is made variable within 20 to 85% based on the battery remaining amount. Accordingly, as the battery remaining amount becomes small, engine driving is performed at an early stage from a condition wherein the accelerator opening is low. Consequently, as shown in FIG. 25, the EV region becomes smaller compared with that of the case of FIG. 13, and the engine/charging region can be widened as much. In this instance, in the semi-automatic mode, V1=50 km/s, and in the full automatic mode, V1=40 km/s. Consequently, when the battery remaining amount is small, engine/charging can be performed frequently, and consumption of (the power of) the batteries can be prevented effectively.

Figure 31:
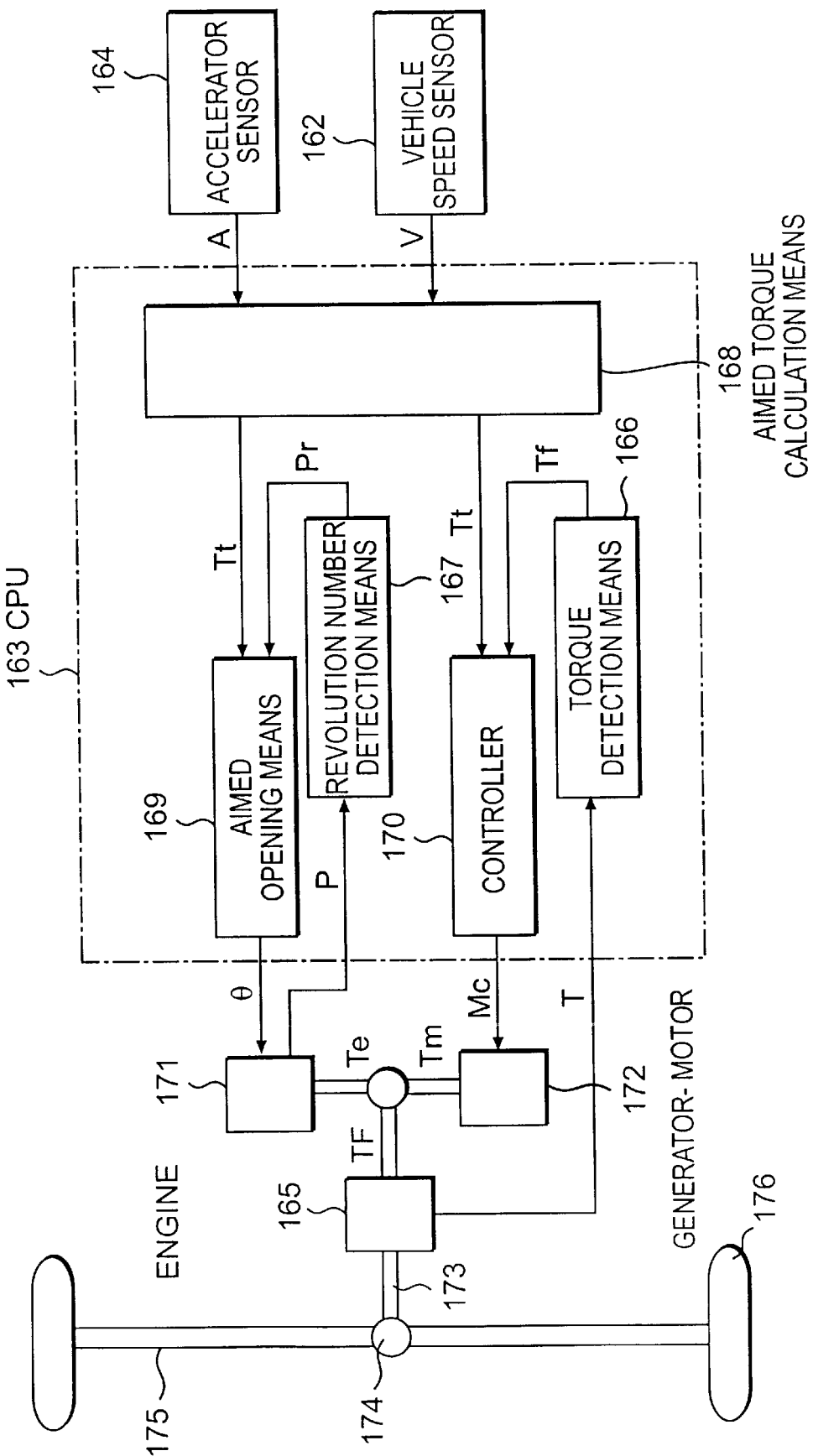
FIG. 31 is a block diagram of a first controlling apparatus for the hybrid car.

FIG. 31 is a block diagram of an important part of a controlling apparatus for a hybrid car according to claim 2. Referring to FIG. 31, the controlling apparatus for a hybrid car includes an accelerator sensor 164, a vehicle speed sensor 162, a torque sensor 165, an engine 171, a generator-motor 172, a common output power shaft (propeller shaft) 173, a differential apparatus 174, a drive shaft (drive shaft) 175, driving wheels 176 and a CPU 163. The CPU 163 is composed of torque detection means 166, aimed torque calculation means 168, aimed opening means 169, revolution number detection means 167 and a controller 170. The accelerator sensor 164 is formed from an operational transformer, a potentiometer or the like and is connected from an accelerator pedal by a wire, and outputs a signal A corresponding to an amount by which the accelerator pedal is operated by a driver and supplies the signal A to the CPU 163.

The vehicle speed sensor 162 has such a construction that a magnet is mounted on the wheel shaft (drive shaft) with poles thereof directed in radial directions and coils are arranged in directions opposing to the magnetic poles or the like. The vehicle speed sensor 162 calculates wheel speed based on a variation of the magnetic poles, outputs a signal V corresponding to a moving speed of the vehicle and supplies the signal V to the CPU 163.

The torque sensor 165 may include electromagnetic coils, photoelectric elements or the like. The coils may be opposing to protrusions of two gear-like disks spaced from each other so that a displacement in phase between the two gear-like disks may be detected as an action of a torsion bar. Alternatively, the coils may be provided at a jointing portion at which the engine 171 and the generator-motor 172 are mechanically connected to each other. Or alternatively, the coils may be provided on the common output power shaft (propeller shaft) at a downstream portion from the joining portion to the differential apparatus. The torque sensor 165 supplies a detected signal Ts to the CPU 163 and calculates a torque amount from the displacement in phase. Further, the torque sensor 165 may be provided at a location from the common output power shaft (propeller shaft) on the downstream side of the joining portion to the drive shaft.

The engine 171 may be a gasoline engine, a diesel engine or other type of an internal combustion engine, and is used as a first power source. The generator-motor 172 or the like is used as a second power source. The first power source and the second power source may be formed from elements having different output powers or a plurality of such first power sources and/or second power sources may be employed.

The engine 171 outputs a driving output torque $T_e$, and the generator-motor 172 outputs a driving output torque $T_m$. At the joining portion or on the common output power shaft at the downstream portion from the joining portion to the differential apparatus, the driving output torque $T_e$ of the engine 171 and the driving output torque $T_m$ of the generator-motor 172 are added to obtain a driving output torque TF.

The common output power shaft (propeller shaft) 173 transmits driving forces at a location from the joining portion at which the engine 171 and the generator-motor 172 are mechanically connected to each other to the differential apparatus 174. The driving forces of the engine 171 and the generator-motor 172 is applied to the driving wheels 176 through the differential apparatus 174 and further through the drive shaft 175.

The differential apparatus 174 distributes the driving forces of the engine 171 and the generator-motor. 172 in both the opposite left and right directions by 90 degrees for the left and the right through the propeller shaft 173 to transmit the driving forces to the drive shaft 175 to transmit power to the driving wheels 176. The differential apparatus also has an action to cancel a displacement between amounts of rotation of the left and right driving wheels 176 while turning a corner or the like.

The drive shaft 175 receives the driving forces of the engine 171 and the generator-motor 172 through the differential apparatus 174 on the left and right and transmits the power to the driving wheels 176. The driving wheels 176 receive the power and are rotated by the driving forces of the engine 171 and the generator-motor 172 through the drive shaft 175 to move the vehicle.

The CPU 163 is basically formed from a microprocessor and is composed of a torque detection means 166, the aimed torque calculation means 168, the aimed opening means 169, the evolution number detection means 167 and the controller 170. The CPU 163 is supplied with a signal T from the torque sensor 165, a signal A from the accelerator sensor 164, a signal V from the vehicle speed sensor 162, a rotation signal P from the engine 171 and so forth.

Inside the CPU 163, the aimed torque calculation means 168 supplies a signal $T_t$, obtained by calculation of an aimed torque from the signal A from the accelerator sensor 164 and the signal V from the vehicle speed sensor 162, to the aimed opening means 169. The aimed opening means 169 receives the signal Tt and a signal Pr, obtained by detecting a number of revolutions by the rotation signal P from the engine 171 by the revolution number detection means 167. The aimed opening means 169 calculates an aimed opening of a throttle and supplies a signal ⊖ to a throttle actuator for the engine 171.

Further, the aimed torque calculation means 168 supplies the signal $T_t$ to the controller 170. The controller 170 receives the signal $T_t$ and a signal $T_f$, based on an absolute value of a torque amount obtained by detecting the signal T from the torque sensor 165 by the torque detection means 166. The controller 170 calculates a control amount for the generator-motor 172 and controls the generator-motor 172 with a control signal $M_c$.

The CPU 163 drives the engine 171 normally in a fixed condition. The CPU 163 can also drive the engine 171 outside the fixed condition when a variation of the driving force caused by an actual running condition of the vehicle, such as upon starting of the engine 171. Unique characteristics of the individual engine 171, and so forth, are detected by the torque sensor 165 provided on the common output power shaft (propeller shaft) 173. The unique characteristics reveal that the output power amount of the engine 171 is insufficient for an accelerator signal amount A requested by a driver. The generator-motor 172 can make up for the shortage while the torque amount T of the common output power shaft can always be fed back to obtain stabilized power having a linearity in running driving torque.

Figure 32:
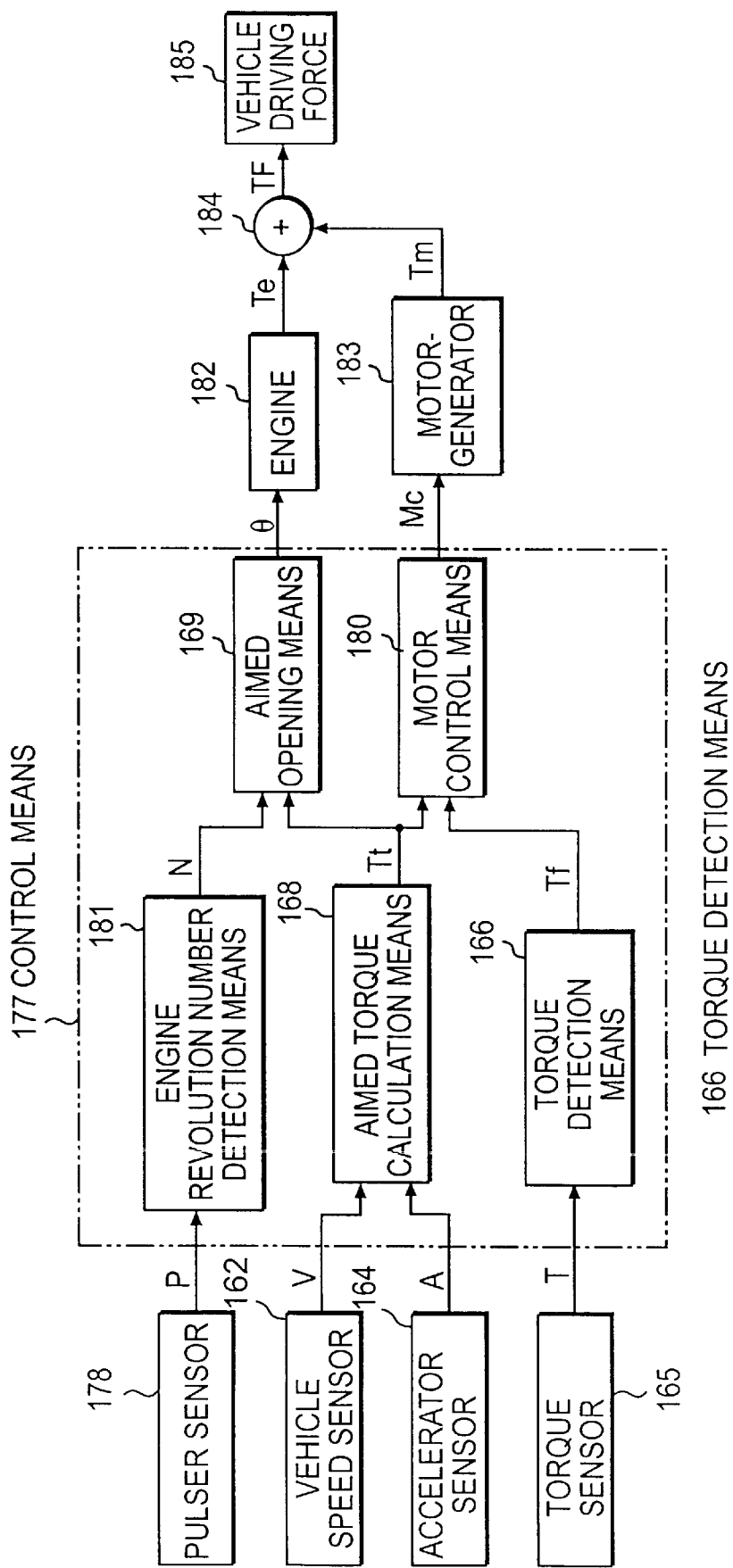
FIG. 32 is a block diagram of a second controlling apparatus for the hybrid car.

FIG. 32 is a block diagram of an important part of a hybrid car controlling apparatus. FIG. 32 illustrates an engine 182, a motor-generator 183, an accelerator sensor 164, a vehicle speed sensor 162, a torque sensor 165, a pulser sensor 178 and control means 177. A torque amount T is provided by the torque sensor 165, located at a joining portion of output powers of the engine 182 and the motor-generator 183 or on the downstream side from the joining portion. The torque amount T is measured with respect to a driving output power $T_e$ of the engine 182. When the torque amount T from the accelerator sensor 164 is short from a request torque amount, a driving output power $T_m$ from the motor-generator 183 is added by an addition section 184 to obtain a vehicle driving force 185.

For the pulser sensor 178, a pulser sensor of the electromagnetic pickup type which makes use of a variation in reluctance is used. The pulser sensor 178 is composed of a reluctance element provided on a rotor connected to a crankshaft and a pulser coil disposed in a non-contacting opposing relationship to the reluctance element. The pulser sensor 178 supplies a pulser signal P. which is generated by the pulser coil when the reluctance element moves toward the pulser coil and moves away from the pulser coil. The pulser signal P is supplied to the control means 177.

The vehicle speed sensor 162 has such a construction that a magnet is mounted on a wheel shaft (drive shaft) with magnetic poles thereof directed in radial directions. Coils are arranged in directions opposing to the magnetic poles or the like. The vehicle speed sensor 162 calculates a wheel speed from a variation amount of magnetic fluxes and outputs a signal V corresponding to a moving speed of the vehicle. The signal V is supplied to the control means 177.

The accelerator sensor 164 is formed from an operational transformer, a potentiometer or the like. The accelerator sensor 164 is connected from an accelerator pedal by a wire, and outputs a signal A corresponding to an amount by which the accelerator pedal is operated by a driver. The accelerator sensor 164 supplies a signal A to the control means 177.

The torque sensor 165 may include electromagnetic coils, photoelectric elements or the like opposing to protrusions of two gear-like disks spaced from each other. Upon a displacement in phase between the two gear-like disks, the torque sensor 165 will detect an action of a torsion bar. Alternatively, the torque sensor 165 may be provided at a jointing portion at which the engine 182 and the generator-motor 183 are mechanically connected to each other. Alternatively, the torque sensor 165 may be provided on the common output power shaft (propeller shaft) at a downstream portion from the joining portion to the differential apparatus such that it supplies a detected signal T to the control means 177. Otherwise, the torque sensor 165 may be provided at a location from the common output power shaft (propeller shaft) on the downstream side from the joining portion to the drive shaft.

The engine 182 is formed from a gasoline engine, a diesel engine or the like. A signal θ of an aimed opening is supplied from the control means 177 to a throttle actuator based on a signal A detected by the accelerator sensor 164. The signal A corresponds to the amount of operation of the accelerator pedal of a driver and a pulser signal P detected by the pulser sensor 178. The amount of fuel is controlled by the throttle actuator to adjust the number of revolutions of the engine to adjust the engine torque.

The motor-generator 183 includes a motor which generates rotational torque to rotate the drive shaft. The motor-generator 183 is controlled by a motor control signal $M_a$ from the control means 177. The motor control signal $M_c$ is based on the signal A detected by the accelerator sensor 164, the signal V detected by the vehicle speed sensor 162 and the torque signal T detected by the torque sensor 165, driving current from a battery not shown by means of a switching element or the like to vary the pulse width of the current. A generator generates regeneration current by rotation from the common output power shaft 173 caused by the engine 182 or torque of inertia.

The control means 177 is basically formed from a microprocessor and is composed of the torque detection means 166, the aimed torque calculation means 168, the aimed opening means 169, the engine revolution number detection means 181 and the motor control means 180. The control means 177 receives a signal T from the torque sensor 165, a signal A from the accelerator sensor 164, a signal V from the vehicle speed sensor 162, a signal P from the pulser sensor 178 and so forth. The control means 177 supplies a signal θ of an aimed opening to the engine 182 and outputs a control signal $M_c$ for the motor to the motor-generator 183. The control means 177 also performs charging of the battery not shown with power generated by the generator section of the motor-generator 183 using regeneration torque of the engine 182.

During battery charging, if a connection is established directly from the generator to the battery to form a closed circuit between the generator and the battery, then a braking force is applied suddenly against the regeneration torque of the engine 182. Therefore, an element equivalent to a switching element for controlling the motor section is connected in the opposite direction or the motor and the generator are connected to form an H-bridge so as to apply common control to them. The pulse width of driving pulses of the switching element is controlled with a PWM signal to effect such control as to increase the charge current to gradually increase.

The engine revolution number detection means 181 is formed from a counter, an arithmetic circuit and so forth. The engine revolution number detection means 181 calculates, from the pulser signal P from the pulser sensor 178, a period of the pulser signal P (a period from a pulse generated when a reluctance element approaches a pulse coil to another pulse generated when a next reluctance element approaches the pulse coil). Then the engine revolution number detection means 181 determines a speed of revolution of the engine using the period. Retrieval of a table, a map or the like of a BTDC with respect to an injection amount of fuel, an ignition timing or the like, for driving of the engine is based on the number of revolutions of the engine, since they are functions of the time. The engine revolution number detection means 181 performs calculations, not only of the number of revolutions of the engine, but also of the speed of revolution. Further, the engine revolution number detection means 181 supplies a signal N of the engine revolution number to the aimed opening means 169.

The torque detection means 166 is formed from a comparator, an arithmetic unit, a transmitter and so forth. The torque detection means 166 receives a signal T of a torque amount of the joining portion, at which the engine 182 and the motor-generator 183 are mechanically connected to each other and the torque sensor 165 is provided, or a downstream portion from the joining portion. The torque detection means 166 calculates a torque amount from a displacement in phase of the signal T and supplies a signal $T_f$ based on an absolute value of the torque amount to the motor control means 180. The positive/negative value of the signal $T_f$ indicates the direction of driving, and, for example, the positive value represents counterclockwise rotation and corresponds to forward running of the vehicle, while the negative value indicates clockwise rotation and corresponds to backward running of the vehicle.

Figure 34:
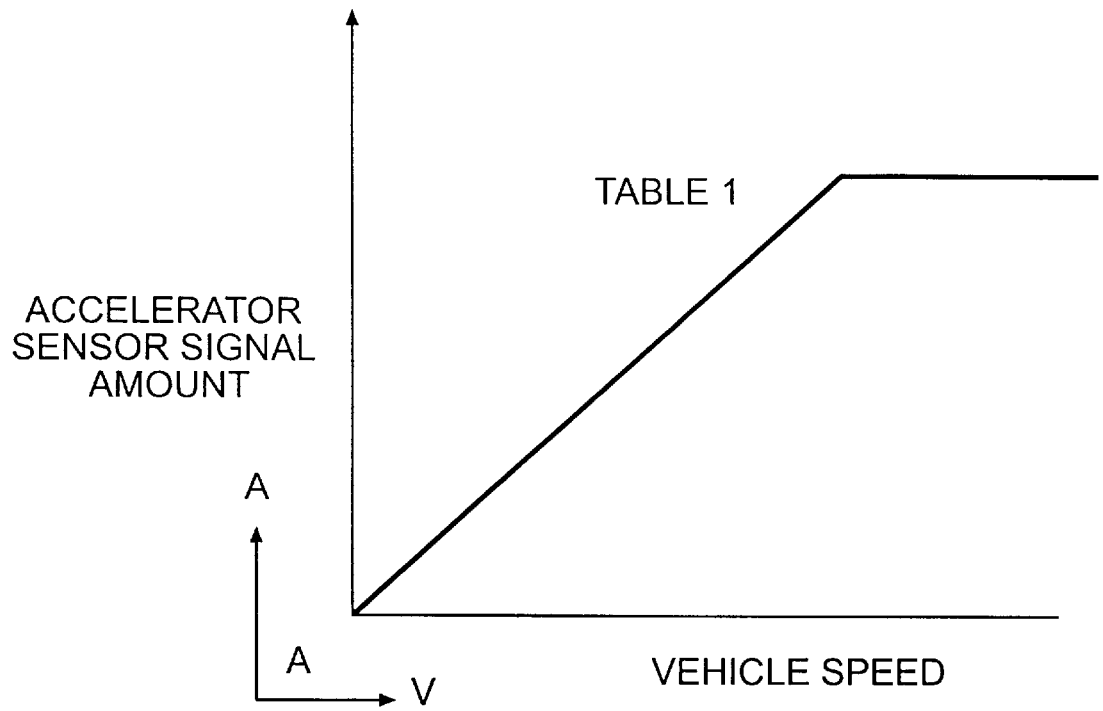
FIG. 34 is a characteristic diagram corresponding to an accelerator signal A and a vehicle speed signal V.

The aimed torque calculation means 168 performs table retrieval based on the signal A from the accelerator sensor 164 and the signal V from the vehicle speed sensor 162. The aimed torque calculation means 168 calculates an aimed torque to be aimed and supplies an aimed torque amount signal $T_t$ of a result of the calculation to the aimed opening means 169 and the motor control means 180. The aimed torque calculation means 168 includes a memory such as a ROM. The ROM stores data of the aimed torque amount $T_t$ which is a torque amount to be aimed corresponding to a signal A amount (or also an operation angle of the accelerator pedal or the like is equivalent) from the accelerator sensor 164 and the signal V from the vehicle speed sensor 162. For example, a table 1 of data (see FIG. 34) set based on an experiment, theoretical calculation or the like is stored in advance. The aimed torque calculation means 168 selects and outputs an aimed torque amount Tt corresponding to inputs of the accelerator signal A after digital conversion and the vehicle speed signal V. The aimed torque calculation means 168 performs table retrieval based on the signal A from the accelerator sensor 164 and the signal V from the vehicle speed sensor 162. The aimed torque calculation means 168 then calculates an aimed torque to be aimed and supplies an aimed torque amount signal Tt to the aimed opening means 169 and the motor control means 180.

Figure 35:
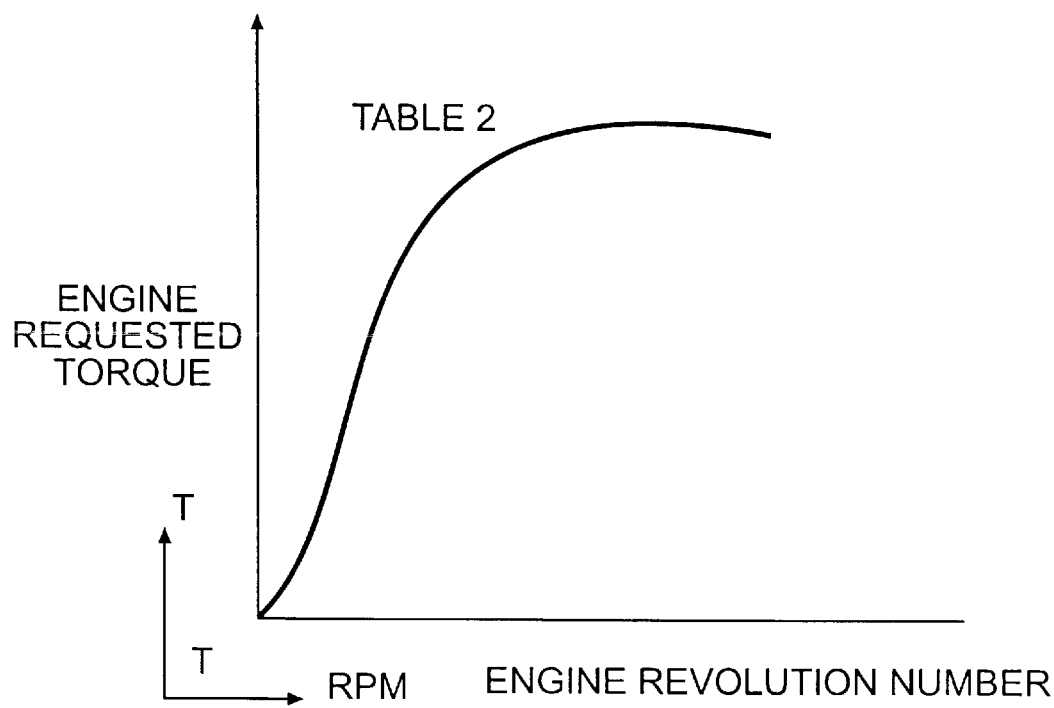
FIG. 35 is a characteristic diagram corresponding to an engine revolution number signal N and an engine requested torque signal Tt.

The aimed opening means 169 performs table retrieval based on, whether the aimed torque value $T_t$ obtained by the aimed torque calculation means 168 is equal to a torque value requested by the engine, the signal $T_t$ and the signal N from the engine revolution number detection means 181. The aimed opening means 169 then calculates an opening of the throttle to be aimed, and supplies an aimed opening signal θ to the throttle actuator for the engine 182. The aimed opening means 169 includes a memory such as a ROM. The ROM stores data of the aimed opening amount θ which is an opening amount of the throttle corresponding to the signal N from the engine revolution number detection means 181 and the signal $T_t$ from the aimed torque calculation means 168. For example, a table 2 of data (see FIG. 35), based on an experiment, theoretical calculation or the like is stored in advance. The aimed opening means 169 selects and outputs an aimed torque amount signal θ corresponding to inputs of the engine revolution number signal N after digital conversion and the engine requested torque signal Tt. Furthermore, the aimed opening means 169 includes, though not shown, a ROM in which, for example, a fuel injection amount corresponding to an intake pipe negative pressure (PB), a sensor amount such as a water temperature sensor and a number of revolutions of the engine are stored as a map. The aimed opening means 169 also can cause the engine to control the optimum opening amount of the throttle by retrieval of the ROM.

In this manner, the aimed opening means 169 supplies an aimed opening signal θ of the throttle to the engine 182 based on the aimed torque signal $T_t$ from the aimed torque calculation means 168. The aimed opening signal θ is based on the signal A from the accelerator sensor 164 and the signal V from the vehicle speed sensor 162, and the signal P from the pulser sensor 178.

The motor control means 180 is formed from a transmission circuit, a delay circuit and so forth. The motor control means 180 performs table retrieval and calculation based on the aimed torque signal $T_t$, from the aimed torque calculation means 168, and the signal $T_f$ based on an absolute value of the torque amount T from the torque detection means 166. The motor control means 180 supplies a control amount signal $M_c$ for the motor to the motor section of the motor-generator 183. The motor control means 180 supplies a PWM signal to a switching element such as an FET, a GTO, an IGBT. The PWM signal is used to vary the pulse width of current from the battery. The motor control means 180 supplies the PWM signal current of the varied pulse width to the motor section of the motor-generator 183.

Furthermore, the motor control means 180 detects an output torque amount Te of the driving torque of the engine 182 (actually a driving torque amount TF at a portion on the downstream of the joining portion), which is driven based on the aimed opening signal θ corresponding to the signal A from the accelerator sensor 164. The output torque amount Te is detected by means of the torque sensor 165. The motor control means 180 does not supply a control amount signal Mc to the motor when the output torque amount Te (TF) is higher than the aimed torque signal $T_t$ for the engine. If the control amount signal Mc is being supplied to the motor at present, then the motor control means 180 decreases the control amount of the signal $M_c$.

The motor control means 180 detects the output torque amount Te of the driving torque of the engine 182 (actually the driving torque amount TF at the portion on the downstream of the joining portion), which is driven based on the aimed opening signal θ corresponding to the signal A from the accelerator sensor 164. The output torque amount Te is detected by means of the torque sensor 165. The motor control means 180 supplies a control amount signal $M_c$ to the motor when the output torque amount $T_e$ (TF) is lower than the aimed torque signal $T_t$ for the engine. If the control amount signal $M_c$ is being supplied to the motor at present, then the motor control means 180 further increases the control amount of the signal $M_c$.

The motor control means 180 detects the output torque amount Te of the driving torque of the engine 182 (actually the driving torque amount TF at the portion on the downstream of the joining portion), which is driven based on the aimed opening signal θ corresponding to the signal A from the accelerator sensor 164. The output torque amount Te is detected by means of the torque sensor 165. The motor control means 180 keeps the signal amount without varying the supply of the control amount signal $M_c$ to the motor, when the output torque amount $T_e$ (TF) is equal to the aimed torque signal $T_t$ for the engine.

Further, the motor control means 180 includes a memory such as a ROM which is set based on an experiment or theoretical calculation. The motor control means 180 performs starting driving only with the motor-generator 183 when the vehicle speed signal V from the vehicle speed sensor 162 increases from 0. For example, when driving torque of the engine 182 is outputted momentarily such as upon starting of the vehicle or upon starting from a condition wherein generation is performed by the generator using regeneration torque of the engine 182 while the vehicle is in a stopping condition, braking force actually acts against the driving torque of the engine 182.

The motor control means 180 controls, in such an instance wherein generation is performed by the generator section of the motor-generator 183 using regeneration torque of the engine 182 in a condition wherein the vehicle is on an inclined road, the control signal amount $M_c$ to the motor upon changing over of regeneration involved in generation to keep the linearity of the running driving torque. For example, when the vehicle is running at such a location as a downhill road, since braking is applied against a fixed engine torque if generation is performed, while the vehicle speed signal V is read, changing over from the generator of the motor-generator 183 to the battery is controlled by controlling the ON/OFF times of a switching element so that current from the generator may not be connected at a time to the battery to form a closed circuit. As a converse example, when the vehicle is running at such a location as an uphill road, if driving torque is added to a fixed engine torque with the motor, then sudden acceleration is applied, and therefore, while the vehicle speed signal V is read, changing over to the motor is controlled by controlling the ON/OFF times of the switching element so that the motor may not be driven at a time.

The addition section 184 adds, at the joining portion at which the engine 182 and the motor-generator 183 are mechanically connected to each other, a driving output power Tm of the motor-generator 183 to a driving output power Te of the engine 182 to obtained a thus added driving output power TF. The vehicle driving force 185 obtains a driving force obtained by the mechanical connection of the engine 182 and the motor-generator 183 to each other, and obtains a driving force originating only from the engine 182, a driving force originating only from the motor of the motor-generator 183 and an added driving force originating from the two of the engine 182 and the motor-generator 183 to drive the wheels not shown to cause the vehicle to run.

In this manner, with the controlling apparatus for a hybrid car, since the engine calculates, based on the timed torque signal and the engine revolution number signal, a throttle opening, based on which the fuel injection amount is controlled, while the generator-motor includes a generator for generating regeneration current by rotation from the drive shaft, and motor control means for controlling a motor based on the aimed torque signal and the actual torque signal, and driving of the generator-motor is controlled based on a driving control signal from the motor controlling means, a linearity of the running driving torque which has a short response time and is quick can be obtained.

Figure 33:
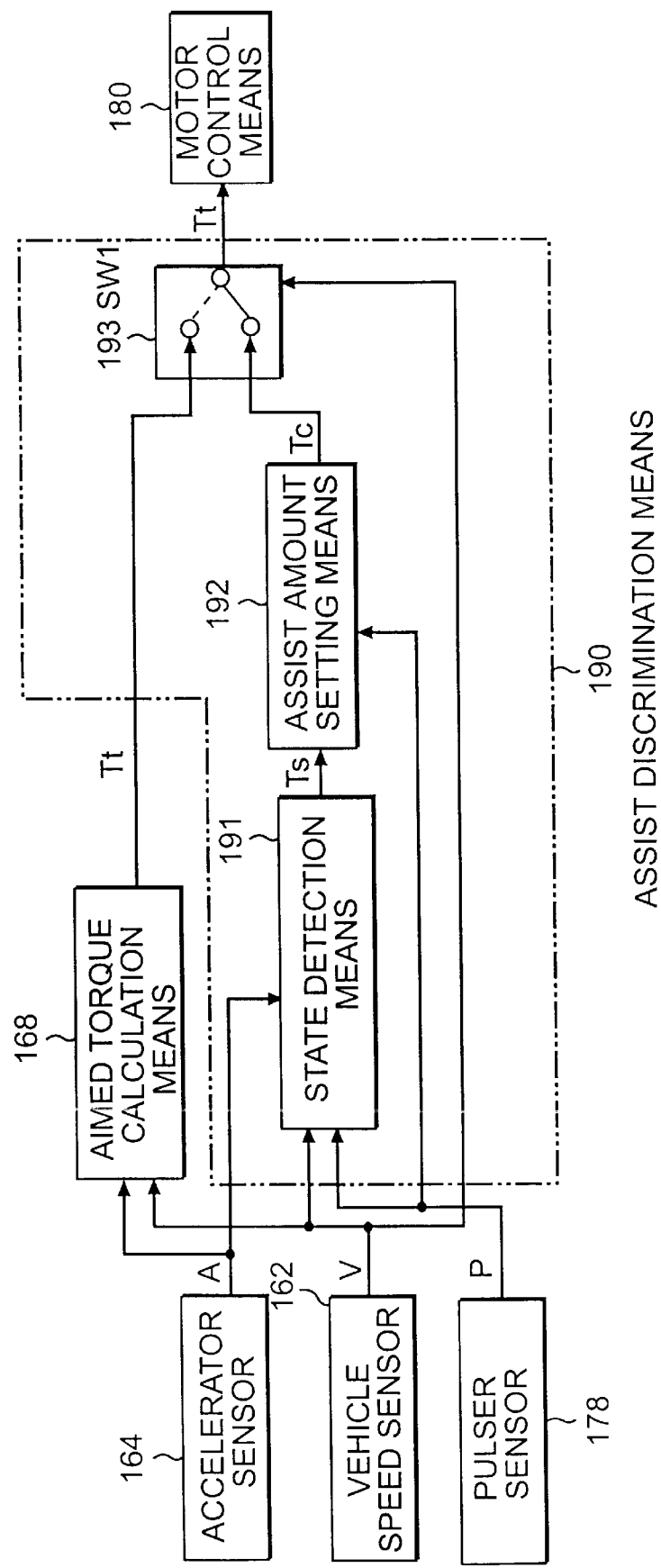
FIG. 33 is a block diagram of an important part of an assist discrimination means of a controlling apparatus for the hybrid car.

FIG. 33 is a block diagram of essential part of an assist discrimination means of a hybrid car controlling apparatus. FIG. 33 illustrates a pulser sensor 178, a vehicle speed sensor 162, an accelerator sensor 164, aimed torque calculation means 168, motor control means 180 and assist discrimination means 190. The object is to control an assist amount when a driving output power from the motor-generator 183 is added to the engine 182 in accordance with a use condition, an individual unique characteristic or the like of the engine 182 upon starting. The object is also to supply the assist amount to the motor control means 180 so that a continuous and smooth running driving force which is fast in response time and quick can be obtained.

The assist discrimination means 190 is composed of state detection means 191, assist amount setting means 192 and a switch 193. The assist discrimination means 190 includes a memory such as a ROM, which is set based on an experiment, theoretical calculation or the like. The assist discrimination means 190 supplies a control signal $T_t$ to the motor control means 180. The control signal $T_t$ corresponds to a use condition, an individual unique characteristic and so forth of the engine 182 upon starting or the like based on an accelerator signal A from the accelerator sensor 164, a vehicle speed signal V from the vehicle speed sensor 162 and a pulser signal P from the pulser sensor 178.

The state detection means 191 includes a memory such as a ROM, which is set based on an experiment, theoretical calculation or the like. The state detection means 191 supplies a signal $T_s$ to the assist amount setting means 192. The signal $T_s$ corresponds to a state based on the accelerator signal A from the accelerator sensor 164, the vehicle speed signal V from the vehicle speed sensor 162 and the pulser signal P from the pulser sensor 178.

The state detection means 191 detects whether or not the vehicle speed signal V is 0, and detects the number of revolutions of the engine in a condition wherein the vehicle speed is 0 and detects a state whether the number of revolutions is lower or higher than a preset value which is based on the experiment, theoretical calculation or the like. The state detection means 191 detects, based on a detection value, a stopping condition of the vehicle or a use condition upon starting or the like, an individual unique characteristic and so forth. For example, if the vehicle speed is 0 and the number of revolutions of the engine is equal to the preset value, then the vehicle is in an ordinary stopping condition such as when the vehicle is waiting for a change of a traffic signal.

When the vehicle speed is 0 and the number of revolutions of the engine is higher than the preset value, the state detection means 191 is in a condition when the engine is started (starting from a condition wherein the engine is cold), or an air conditioner or the like is being driven. These conditions are stored in the ROM so that the driving torque may not be influenced. Furthermore, when the vehicle speed is 0 and the number of revolutions of the engine is lower than the preset value, the state detection means 191 detects a state wherein generation is being performed by the generator using regeneration torque.

When the fuel or the battery is short, the state detection means 191 issues an alarm to inform a driver of this fact. The state detection means 191 performs such state detection and discrimination as described above, and detects, when it is supplied with the accelerator signal A in such conditions, starting of the vehicle (when the vehicle speed signal V increases from 0) and supplies the signal $T_s$ to the assist amount setting means 192.

The assist amount setting means 192 includes a memory such as a ROM, which is set based on an experiment, theoretical calculation or the like. The assist amount setting means 192 supplies an assist amount signal $T_c$ conforming to a state based on the signal $T_s$ from the state detection means 191 and the pulser signal P from the pulser sensor 178 to the switch 193. In an ordinary stopping condition (the vehicle speed V=0 and the engine revolution number is equal to the preset value), if the accelerator signal A is received, then the assist amount setting means 192 performs starting only with the motor, and changes over to the driving output power of the engine 182 in response to a signal of output driving torque, by time control of, for example, several milliseconds. Upon starting (starting from a condition wherein the engine is cold), if the accelerator signal A is received, the assist amount setting means 192 reads the signal P from the pulser sensor 178 and supplies an assist amount signal $T_c$ to the switch 193 so that generation may be performed by the generator section of the motor-generator by an amount by which the signal P is larger than the preset revolution number of the engine to apply braking to the engine to decrease the assist amount.

The switch 193 has a switching function of software program control, and performs, based on the vehicle speed signal V, for example, in an ordinary stopping condition (the vehicle speed V=0 and the engine revolution number is equal to the preset value), starting only with the motor and changes over, when the vehicle speed becomes equal to the preset vehicle speed, to the aimed torque signal $T_t$ of the aimed torque calculation means 168 in response to the vehicle speed signal V. For example, the switch (SW1) 33 selects, when the vehicle speed signal V=0 is detected, the signal $T_c$ of starting only with the motor (a solid line of SW1), but when the signal V of the preset vehicle speed is detected, selects the aimed torque signal $T_t$ (dotted line of SW1) and outputs the signal $T_t$ to the motor control means 180.

With an internal combustion engine, the driving output power is controlled by control of intake/exhaust of air for combustion of fuel, the fuel supply, control of the ignition timing, control of the compression ratio and/or so forth. Meanwhile, also the driving output power is different depending upon use (when cold, hot), and variations of the environment (the external air temperature, the atmospheric pressure or the like).

In the motor of the generator-motor 172, the driving output power is controlled by electric input control. Consequently, since the motor is controlled and driven by electric control (voltage, current, a frequency, a pulse and so forth) based on an electric signal from the torque sensor, a continuous and smooth running driving power which is fast in response time and quick is obtained upon changing over or simultaneous use of the driving force of the vehicle.

By the present invention, the controlling apparatus for a hybrid car comprises the assist discrimination means for additionally using or changing over the driving output power of the generator-motor in response to the driving output power of the engine, even during regeneration control, the running driving torque which exhibits a short response time and is quick can be kept stably.

Figure 36:
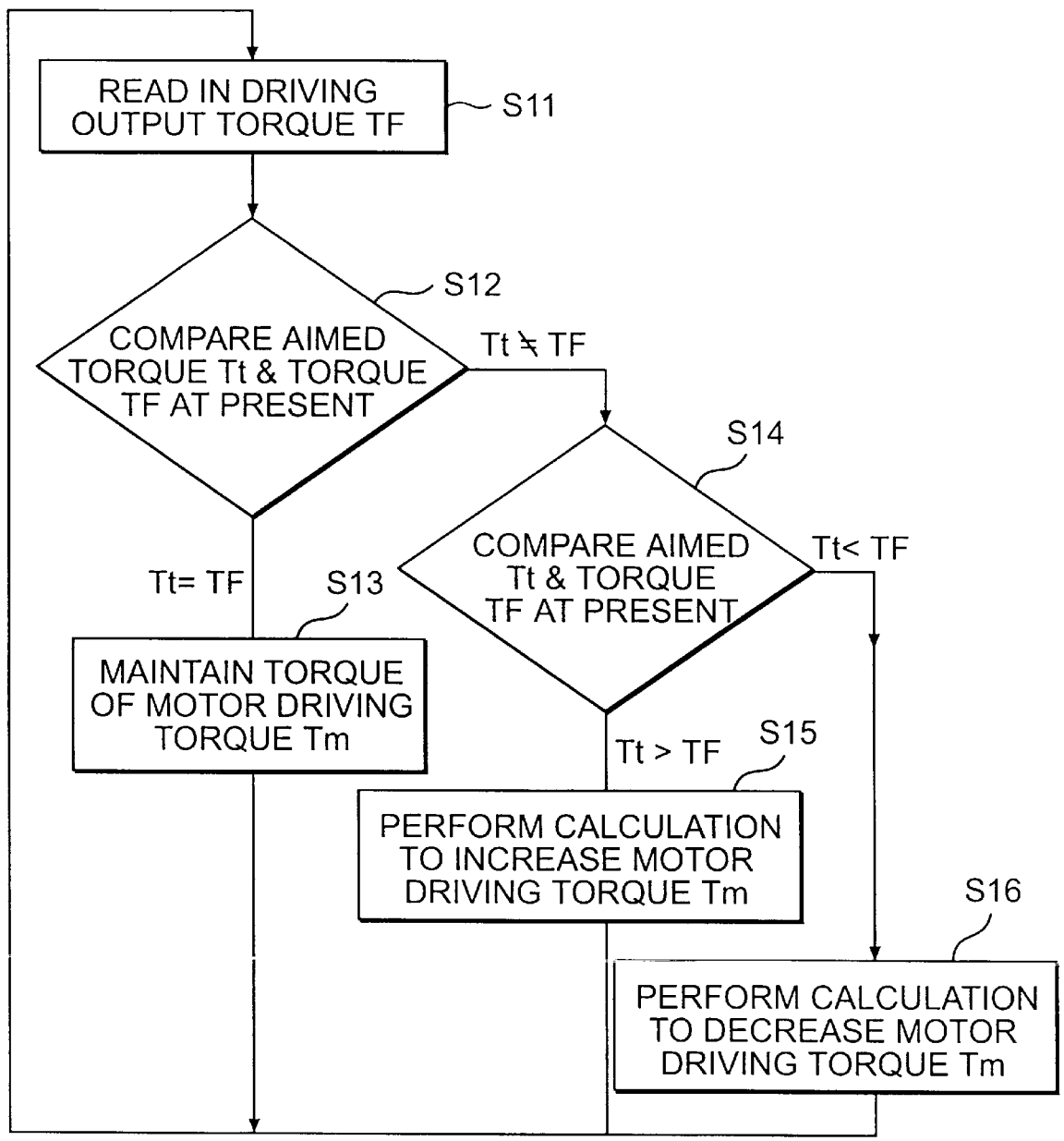
FIG. 36 is a control flow chart of a torque amount feedback according to the present invention.

FIG. 36 shows a control flow diagram of torque amount feedback according to the present invention. FIG. 36 shows a control flow wherein the engine 182 is driven always in a fixed condition, and a variation of a driving output power TF by an actual running condition of the vehicle, a use condition upon starting or the like, an individual unique characteristic and so forth of the engine 182 is detected by the torque sensor 165 provided on the common output power shaft (propeller shaft) 173 mechanically connected to the engine 182. When the accelerator signal amount A requested by the driver is not sufficient with the output power amount $T_e$ only of the engine 182, the motor section of the motor-generator 183 is driven so that the short amount is made up for with the driving output power $T_m$ while the torque amount TF of the common output power shaft is always fed back.

In S11, the torque sensor 165 is provided on the common output power shaft (propeller shaft) 173 to which the engine 182 and the motor-generator 183 are mechanically connected, and the substantial driving output torque TF which drives the wheels is read in. Then, in S12, comparison between the aimed torque $T_t$ based on the signal V from the vehicle speed sensor 162 and the signal A from the accelerator sensor 164 and the substantial driving output torque TF at present is performed, and in the case of $T_t$=TF, the control advances to S13, but in the case of $T_t \neq$TF, the control advances to S14.

In S13, the aimed torque $T_t$ and the substantial driving output torque TF at present are equal to each other. In this instance, the torque of the output driving torque Tm of the motor is maintained. This keeps fixed the signal $M_c$ to be supplied to the motor section of the motor-generator 183 from the motor control means 180.

In S14, while the aimed torque $T_t$ and the substantial driving output torque TF at present are not equal to each other, the substantial output torque TF at present with respect to the aimed torque $T_t$ is compared in magnitude. When $T_t$>TF, the control advances to S15, but when $T_t$<TF, the control advances to S16. S15 is a case wherein the aimed torque $T_t$ is higher than the substantial driving output torque TF at present, and increase of the output driving torque $T_m$ of the motor is performed. This increases the signal $M_c$ to be supplied to the motor section of the motor-generator 183 from the motor control means 180.

Meanwhile, S16 is a case wherein the aimed torque $T_t$ is smaller than the substantial driving output torque TF at present, and decrease of the output driving torque $T_m$ of the motor is performed. This decreases the signal $M_c$ to be supplied to the motor section of the motor-generator 183 from the motor control means 180, or generation is performed by the generator section of the motor-generator 183 to apply a braking force to the driving output torque TF.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power plant for a vehicle comprising:
   a drive shaft for turning at least one wheel of the vehicle;
   an engine for providing a first driving power to said drive shaft;
   a generator-motor for providing a second driving power to said drive shaft;
   a battery for supplying and receiving power to and from said generator-motor;
   an accelerator sensor for detecting an amount by which an operator of the vehicle operates an accelerator and for producing an accelerator operation amount signal;
   a vehicle speed sensor for detecting a speed of the vehicle and for producing a vehicle speed signal;
   aimed torque calculation means for calculating an aimed torque signal based on said accelerator operation amount signal and said vehicle speed signal;
   torque detection means, provided adjacent said drive shaft, for detecting an actual torque and for providing an actual torque signal, wherein said engine includes a throttle and aimed opening means for calculating an aimed opening signal relating to an opening amount for said throttle based on said aimed torque signal and an engine revolution signal, said engine is controlled based on said aimed opening signal, and said generator-motor is controlled based on said aimed torque signal and said actual torque signal; and
   assist discrimination means for causing said second driving power provided by said generator-motor to be applied to said drive shaft to thereby supplement said first driving power provided by said engine to said drive shaft in response to a first predetermined level of said first driving power provided by said engine.

2. The power plant according to claim 1, wherein said drive shaft is a crankshaft.

3. The power plant according to claim 1, wherein said drive shaft is a wheel axle.

4. The power plant according to claim 1, wherein said engine is an internal combustion engine.

5. The power plant according to claim 1, wherein said engine includes:
   a pulser for detecting revolutions of said engine and for producing said engine revolution signal; and
   an engine revolution number detection means for receiving said engine revolution signal and for detecting a number of revolutions of said engine, wherein said aimed opening signal relating to an opening amount for said throttle is used to determine a fuel injection amount for said throttle.

6. The power plant according to claim 1, wherein said generator-motor includes:
   a generator for generating regeneration current from rotation of said drive shaft; and
   motor control means for providing a driving control signal to control driving of said generator-motor.

7. The power plant according to claim 1, wherein said assist discrimination means also has the ability for causing said second driving power provided by said generator-motor to be applied to said drive shaft to replace said first driving power provided by said engine to said driveshaft in response to a second predetermined level of said first driving power provided by said engine.

8. A power plant for a vehicle comprising:
   a drive shaft for turning at least one wheel of the vehicle;
   an engine for providing a first driving power to said drive shaft;
   a generator-motor for providing a second driving power to said drive shaft;
   a battery for supplying and receiving power to and from said generator-motor;
   an accelerator sensor for detecting an amount by which an operator of the vehicle operates an accelerator and for producing an accelerator operation amount signal;
   a vehicle speed sensor for detecting a speed of the vehicle and for producing a vehicle speed signal;
   aimed torque calculation means for calculating an aimed torque signal based on said accelerator operation amount signal and said vehicle speed signal; and
   torque detection means, provided adjacent said drive shaft, for detecting an actual torque and for providing an actual torque signal, wherein said engine includes a throttle and aimed opening means for calculating an aimed opening signal relating to an opening amount for said throttle based on said aimed torque signal and an engine revolution signal, said engine is controlled based on said aimed opening signal, and said generator-motor is controlled based on said aimed torque signal and said actual torque signal, and wherein said engine includes:
   a pulser for detecting revolutions of said engine and for producing said engine revolution signal; and
   an engine revolution number detection means for receiving said engine revolution signal and for detecting a number of revolutions of said engine, wherein said aimed opening signal relating to an opening amount for said throttle is used to determine a fuel injection amount for said throttle, and wherein said generator-motor includes:
   a generator for generating regeneration current from rotation of said drive shaft; and
   motor control means for providing a driving control signal to control driving of said generator-motor.

9. The power plant according to claim 8, wherein said drive shaft is a crankshaft.

10. The power plant according to claim 8, wherein said drive shaft is a wheel axle.

11. The power plant according to claim 8, wherein said engine is an internal combustion engine.

12. The power plant according to claim 8, further comprising:
    assist discrimination means for causing said second driving power provided by said generator-motor to be applied to said drive shaft to thereby supplement said first driving power provided by said engine to said drive shaft in response to a first predetermined level of said first driving power provided by said engine.

13. The power plant according to claim 12, wherein said assist discrimination means also has the ability for causing said second driving power provided by said generator-motor to be applied to said drive shaft to replace said first driving power provided by said engine to said driveshaft in response to a second predetermined level of said first driving power provided by said engine.

14. The power plant according to claim 8, further comprising:

assist discrimination means for causing said second driving power provided by said generator-motor to be applied to said drive shaft to thereby replace said first driving power provided by said engine to said drive shaft in response to a predetermined level of said first driving power provided by said engine.

15. A power plant for a vehicle comprising:

a drive shaft for turning at least one wheel of the vehicle;

an engine for providing a first driving power to said drive shaft;

a generator-motor for providing a second driving power to said drive shaft;

a battery for supplying and receiving power to and from said generator-motor;

an accelerator sensor for detecting an amount by which an operator of the vehicle operates an accelerator and for producing an accelerator operation amount signal;

a vehicle speed sensor for detecting a speed of the vehicle and for producing a vehicle speed signal;

aimed torque calculation means for calculating an aimed torque signal based on said accelerator operation amount signal and said vehicle speed signal;

torque detection means, provided adjacent said drive shaft, for detecting an actual torque and for providing an actual torque signal, wherein said engine includes a throttle and aimed opening means for calculating an aimed opening signal relating to an opening amount for said throttle based on said aimed torque signal and an engine revolution signal, said engine is controlled based on said aimed opening signal, and said generator-motor is controlled based on said aimed torque signal and said actual torque signal; and assist discrimination means for causing said second driving power provided by said generator-motor to be applied to said drive shaft to thereby replace said first driving power provided by said engine to said drive shaft in response to a predetermined level of said first driving power provided by said engine.

16. The power plant according to claim 15, wherein said drive shaft is a crankshaft.

17. The power plant according to claim 15, wherein said drive shaft is a wheel axle.

18. The power plant according to claim 15, wherein said engine is an internal combustion engine.

19. The power plant according to claim 15, wherein said engine includes:

a pulser for detecting revolutions of said engine and for producing said engine revolution signal; and an engine revolution number detection means for receiving said engine revolution signal and for detecting a number of revolutions of said engine, wherein said aimed opening signal relating to an opening amount for said throttle is used to determine a fuel injection amount for said throttle.

20. The power plant according to claim 15, wherein said generator-motor includes:

a generator for generating regeneration current from rotation of said drive shaft; and motor control means for providing a driving control signal to control driving of said generator-motor.

* * * * *